United States Patent
Artman et al.

(10) Patent No.: US 11,954,707 B2
(45) Date of Patent: Apr. 9, 2024

(54) CONSUMER PRESENCE BASED DEAL OFFERS

(71) Applicant: Groupon, Inc., Chicago, IL (US)

(72) Inventors: Tuomas Artman, San Francisco, CA (US); Jyri Engestrom, San Francisco, CA (US); Ulf Schwekendiek, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/303,101

(22) Filed: May 20, 2021

(65) Prior Publication Data
US 2022/0044282 A1    Feb. 10, 2022

Related U.S. Application Data

(63) Continuation of application No. 16/264,177, filed on Jan. 31, 2019, now Pat. No. 11,062,354, which is a
(Continued)

(51) Int. Cl.
*G06Q 30/02*    (2023.01)
*G06Q 20/32*    (2012.01)
(Continued)

(52) U.S. Cl.
CPC ..... *G06Q 30/0261* (2013.01); *G06Q 20/3278* (2013.01); *G06Q 20/36* (2013.01); *G06Q 20/382* (2013.01); *G06Q 20/387* (2013.01)

(58) Field of Classification Search
CPC ........... G06Q 30/0261; G06Q 20/3278; G06Q 20/36; G06Q 20/382; G06Q 20/387
See application file for complete search history.

(56) References Cited

U.S. PATENT DOCUMENTS

| 2,153,480 A | 4/1939 | Pierce |
| 6,208,468 B1 | 3/2001 | Togino et al. |
| (Continued) | | |

FOREIGN PATENT DOCUMENTS

| EP | 1017030 A2 | 7/2000 |
| EP | 2909799 A1 | 8/2015 |
| (Continued) | | |

OTHER PUBLICATIONS

U.S. Appl. No. 16/196,918, filed Nov. 20, 2018 entitled "Consumer Device Payment Token Management".
(Continued)

*Primary Examiner* — Scott C Anderson
(74) *Attorney, Agent, or Firm* — ALSTON & BIRD LLP

(57) ABSTRACT

Systems and related methods facilitating payments with a mobile device are discussed herein. Circuitry in a networked-based central system, which may be a promotional system or payment system, may be configured to receive payment information from a consumer device. The consumer device may include circuitry configured to receive wallet identifying data from the central system. The wallet identification data may be used to secure messages between the consumer device and another device, such as a merchant device, over a wireless link. In some embodiments, the consumer device may receive promotional offers, such as deal vouchers or rewards, and make payments to the other device via the wireless link.

20 Claims, 20 Drawing Sheets

Related U.S. Application Data continuation of application No. 13/801,610, filed on Mar. 13, 2013, now Pat. No. 10,235,692.

(60) Provisional application No. 61/715,230, filed on Oct. 17, 2012.

(51) Int. Cl.
*G06Q 20/36* (2012.01)
*G06Q 20/38* (2012.01)
*G06Q 30/0251* (2023.01)

(56) References Cited

U.S. PATENT DOCUMENTS

| | | | |
|---|---|---|---|
| 6,327,578 B1 | 12/2001 | Linehan | |
| 6,487,180 B1 | 11/2002 | Borgstahl et al. | |
| 6,764,013 B2 | 7/2004 | Ben-Aissa | |
| 6,812,851 B1 | 11/2004 | Dukach et al. | |
| 6,873,974 B1 | 3/2005 | Schutzer | |
| 7,177,847 B2 | 2/2007 | Atkinson et al. | |
| 7,229,013 B2 | 6/2007 | Ben-Aissa | |
| 7,411,491 B2 | 8/2008 | Klabunde et al. | |
| 7,475,813 B2 | 1/2009 | Swanson, Sr. | |
| 7,527,194 B2 | 5/2009 | Truitt et al. | |
| 7,584,118 B1 | 9/2009 | Bellare et al. | |
| 7,609,821 B2 | 10/2009 | Delaney et al. | |
| 7,653,883 B2 | 1/2010 | Hotelling et al. | |
| 7,774,231 B2 | 8/2010 | Pond et al. | |
| 7,891,560 B2 | 2/2011 | Hammad | |
| 7,934,986 B2 | 5/2011 | Kane et al. | |
| 8,045,967 B2 | 10/2011 | Lovegreen et al. | |
| 8,131,619 B1 | 3/2012 | Veselka | |
| 8,224,700 B2 | 7/2012 | Silver | |
| 8,229,853 B2 | 7/2012 | Dispensa et al. | |
| 8,284,061 B1 | 10/2012 | Dione | |
| 8,370,264 B1 | 2/2013 | Wei et al. | |
| 8,844,002 B2 | 9/2014 | Monahan et al. | |
| 9,117,231 B2 | 8/2015 | Rodgers et al. | |
| 9,576,286 B1 | 2/2017 | Artman et al. | |
| 9,665,898 B2 | 5/2017 | Scholl et al. | |
| 9,674,050 B2 | 6/2017 | Martin et al. | |
| 9,852,409 B2 | 12/2017 | Artman et al. | |
| 10,148,659 B2 | 12/2018 | Nandakumar | |
| 10,325,253 B2 | 6/2019 | Artman et al. | |
| 10,482,511 B1 | 11/2019 | Artman et al. | |
| 11,062,287 B2 | 7/2021 | Artman et al. | |
| 2001/0029496 A1 | 10/2001 | Otto et al. | |
| 2002/0017561 A1 | 2/2002 | Tomoike | |
| 2002/0029342 A1 | 3/2002 | Keech | |
| 2002/0072921 A1 | 6/2002 | Boland et al. | |
| 2002/0073044 A1 | 6/2002 | Singhal | |
| 2002/0077993 A1 | 6/2002 | Immonen et al. | |
| 2002/0083342 A1 | 6/2002 | Webb et al. | |
| 2002/0107610 A1 | 8/2002 | Kaehler et al. | |
| 2002/0107791 A1 | 8/2002 | Nobrega et al. | |
| 2002/0142753 A1 | 10/2002 | Pecen et al. | |
| 2002/0151313 A1 | 10/2002 | Stead | |
| 2002/0174023 A1 | 11/2002 | Grey et al. | |
| 2003/0037113 A1 | 2/2003 | Petrovykh | |
| 2003/0088682 A1 | 5/2003 | Hlasny | |
| 2003/0172036 A1 | 9/2003 | Feigenbaum | |
| 2003/0208409 A1 | 11/2003 | Mault | |
| 2004/0030601 A1 | 2/2004 | Pond et al. | |
| 2004/0107170 A1 | 6/2004 | Labrou et al. | |
| 2004/0116074 A1 | 6/2004 | Fujii et al. | |
| 2004/0143473 A1 | 7/2004 | Tivey et al. | |
| 2005/0028082 A1 | 2/2005 | Topalov et al. | |
| 2005/0043996 A1 | 2/2005 | Silver | |
| 2005/0182680 A1 | 8/2005 | Jones et al. | |
| 2005/0187873 A1 | 8/2005 | Labrou et al. | |
| 2005/0256841 A1 | 11/2005 | Rawat et al. | |
| 2005/0273345 A1 | 12/2005 | Castillejo Romero | |
| 2006/0069763 A1 | 3/2006 | Kido | |
| 2006/0080545 A1 | 4/2006 | Bagley | |
| 2006/0085267 A1 | 4/2006 | Lovegreen et al. | |
| 2006/0122855 A1 | 6/2006 | Prorock | |
| 2006/0156060 A1 | 7/2006 | Forrer et al. | |
| 2006/0165060 A1 | 7/2006 | Dua | |
| 2006/0178943 A1 | 8/2006 | Rollinson et al. | |
| 2006/0218043 A1 | 9/2006 | Rosenzweig et al. | |
| 2007/0012763 A1 | 1/2007 | Van et al. | |
| 2007/0061209 A1 | 3/2007 | Jackson | |
| 2007/0150371 A1 | 6/2007 | Gangji | |
| 2007/0162337 A1 | 7/2007 | Hawkins et al. | |
| 2007/0219923 A1 | 9/2007 | Shea et al. | |
| 2007/0250355 A1 | 10/2007 | Leet et al. | |
| 2007/0280269 A1 | 12/2007 | Rosenberg | |
| 2007/0282739 A1 | 12/2007 | Thomsen | |
| 2007/0291915 A1 | 12/2007 | Tseitlin et al. | |
| 2008/0010193 A1 | 1/2008 | Rackley et al. | |
| 2008/0051122 A1 | 2/2008 | Fisher | |
| 2008/0064374 A1 | 3/2008 | Coffing | |
| 2008/0065374 A1 | 3/2008 | Mittal et al. | |
| 2008/0065490 A1 | 3/2008 | Novick et al. | |
| 2008/0090612 A1 | 4/2008 | Glinka | |
| 2008/0097851 A1 | 4/2008 | Bemmel et al. | |
| 2008/0143487 A1 | 6/2008 | Hulvey | |
| 2008/0147546 A1 | 6/2008 | Weichselbaumer et al. | |
| 2008/0162318 A1 | 7/2008 | Butler et al. | |
| 2008/0182616 A1 | 7/2008 | Connors et al. | |
| 2008/0208744 A1 | 8/2008 | Arthur et al. | |
| 2008/0222004 A1 | 9/2008 | Pollock et al. | |
| 2008/0271119 A1* | 10/2008 | Manne | G06Q 30/0277 705/14.69 |
| 2009/0018961 A1 | 1/2009 | Seven et al. | |
| 2009/0030749 A1 | 1/2009 | Drummond et al. | |
| 2009/0037286 A1 | 2/2009 | Foster | |
| 2009/0063312 A1 | 3/2009 | Hurst | |
| 2009/0070263 A1 | 3/2009 | Davis et al. | |
| 2009/0076896 A1 | 3/2009 | Dewitt et al. | |
| 2009/0125997 A1 | 5/2009 | Cook | |
| 2009/0167553 A1 | 7/2009 | Hong et al. | |
| 2009/0192935 A1 | 7/2009 | Griffin et al. | |
| 2009/0204881 A1 | 8/2009 | Murthy et al. | |
| 2009/0265229 A1* | 10/2009 | Sidhu | G06Q 30/02 705/26.1 |
| 2009/0271295 A1 | 10/2009 | Hodge | |
| 2010/0082481 A1 | 4/2010 | Lin et al. | |
| 2010/0094701 A1 | 4/2010 | Ghosh et al. | |
| 2010/0145861 A1 | 6/2010 | Law et al. | |
| 2010/0250549 A1 | 9/2010 | Muller et al. | |
| 2010/0252624 A1 | 10/2010 | Van et al. | |
| 2010/0274680 A1 | 10/2010 | Carlson et al. | |
| 2010/0276484 A1 | 11/2010 | Banerjee et al. | |
| 2010/0320266 A1 | 12/2010 | White | |
| 2010/0325047 A1 | 12/2010 | Carlson et al. | |
| 2011/0010422 A1 | 1/2011 | Bezancon et al. | |
| 2011/0029362 A1 | 2/2011 | Roeding et al. | |
| 2011/0029370 A1 | 2/2011 | Roeding et al. | |
| 2011/0041170 A1 | 2/2011 | Wankmueller | |
| 2011/0047608 A1 | 2/2011 | Levenberg | |
| 2011/0055005 A1 | 3/2011 | Lang | |
| 2011/0057025 A1* | 3/2011 | Denzer | G06Q 20/28 235/375 |
| 2011/0088087 A1 | 4/2011 | Kalbratt | |
| 2011/0093351 A1 | 4/2011 | Afana | |
| 2011/0112897 A1* | 5/2011 | Tietzen | G06Q 30/0222 705/14.25 |
| 2011/0173096 A1 | 7/2011 | Bui | |
| 2011/0191196 A1 | 8/2011 | Orr et al. | |
| 2011/0218911 A1 | 9/2011 | Spodak | |
| 2011/0238499 A1 | 9/2011 | Blackhurst et al. | |
| 2011/0313867 A9 | 12/2011 | Andrew | |
| 2011/0320293 A1 | 12/2011 | Khan | |
| 2012/0005023 A1* | 1/2012 | Graff | G06Q 30/0261 705/14.58 |
| 2012/0016745 A1 | 1/2012 | Hendrickson | |
| 2012/0029990 A1 | 2/2012 | Fisher | |
| 2012/0030066 A1 | 2/2012 | Stringfellow et al. | |
| 2012/0036042 A1 | 2/2012 | Graylin et al. | |
| 2012/0072311 A1 | 3/2012 | Khan | |
| 2012/0088487 A1 | 4/2012 | Khan | |
| 2012/0095852 A1 | 4/2012 | Bauer et al. | |
| 2012/0136754 A1 | 5/2012 | Underwood | |

(56) References Cited

U.S. PATENT DOCUMENTS

| | | |
|---|---|---|
| 2012/0150669 A1 | 6/2012 | Langley et al. |
| 2012/0158528 A1 | 6/2012 | Hsu et al. |
| 2012/0158541 A1 | 6/2012 | Ganti et al. |
| 2012/0172062 A1 | 7/2012 | Altman et al. |
| 2012/0173350 A1 | 7/2012 | Robson |
| 2012/0173431 A1 | 7/2012 | Ritchie et al. |
| 2012/0179528 A1 | 7/2012 | Ortiz et al. |
| 2012/0209729 A1 | 8/2012 | Lovegreen |
| 2012/0209730 A1 | 8/2012 | Garrett |
| 2012/0233005 A1 | 9/2012 | White |
| 2012/0239417 A1 | 9/2012 | Pourfallah et al. |
| 2012/0239560 A1 | 9/2012 | Pourfallah et al. |
| 2012/0246079 A1 | 9/2012 | Wilson et al. |
| 2012/0253908 A1 | 10/2012 | Ouimet et al. |
| 2012/0253913 A1 | 10/2012 | Richard |
| 2012/0254020 A1 | 10/2012 | Debow |
| 2012/0271697 A1 | 10/2012 | Gilman et al. |
| 2012/0271759 A1 | 10/2012 | Lee |
| 2012/0290376 A1 | 11/2012 | Dryer et al. |
| 2012/0290449 A1 | 11/2012 | Mullen et al. |
| 2012/0310743 A1 | 12/2012 | Johri |
| 2012/0317628 A1 | 12/2012 | Yeager |
| 2012/0323664 A1 | 12/2012 | Klems |
| 2012/0330769 A1 | 12/2012 | Arceo |
| 2013/0024364 A1 | 1/2013 | Shrivastava et al. |
| 2013/0030915 A1 | 1/2013 | Statler et al. |
| 2013/0031006 A1 | 1/2013 | Mccullagh et al. |
| 2013/0036048 A1 | 2/2013 | Campos et al. |
| 2013/0036051 A1 | 2/2013 | Giordano et al. |
| 2013/0046634 A1 | 2/2013 | Grigg et al. |
| 2013/0047242 A1 | 2/2013 | Radhakrishnan |
| 2013/0073365 A1 | 3/2013 | Mccarthy |
| 2013/0097031 A1 | 4/2013 | Royyuru et al. |
| 2013/0138518 A1 | 5/2013 | White et al. |
| 2013/0144731 A1 | 6/2013 | Baldwin et al. |
| 2013/0151357 A1 | 6/2013 | Havas et al. |
| 2013/0159080 A1 | 6/2013 | Wu et al. |
| 2013/0159119 A1 | 6/2013 | Henderson et al. |
| 2013/0159181 A1 | 6/2013 | Hueck |
| 2013/0166917 A1* | 6/2013 | Granbery ............... G06Q 50/01 713/168 |
| 2013/0173475 A1 | 7/2013 | Lund |
| 2013/0191174 A1 | 7/2013 | Zhou et al. |
| 2013/0191227 A1 | 7/2013 | Pasa et al. |
| 2013/0198080 A1 | 8/2013 | Anderson et al. |
| 2013/0282438 A1 | 10/2013 | Hunter et al. |
| 2013/0282533 A1 | 10/2013 | Foran-Owens |
| 2013/0304642 A1 | 11/2013 | Campos |
| 2013/0317928 A1 | 11/2013 | Laracey |
| 2013/0339233 A1 | 12/2013 | Lee et al. |
| 2013/0346302 A1 | 12/2013 | Purves et al. |
| 2014/0006182 A1 | 1/2014 | Wilson |
| 2014/0006205 A1 | 1/2014 | Berry et al. |
| 2014/0032297 A1 | 1/2014 | Germann et al. |
| 2014/0037193 A1 | 2/2014 | El et al. |
| 2014/0058862 A1 | 2/2014 | Celkonas |
| 2014/0058938 A1 | 2/2014 | Mcclung, III |
| 2014/0067677 A1 | 3/2014 | Ali et al. |
| 2014/0074655 A1 | 3/2014 | Lim et al. |
| 2014/0099981 A1 | 4/2014 | Horbal |
| 2014/0100973 A1 | 4/2014 | Brown et al. |
| 2014/0108108 A1 | 4/2014 | Artman et al. |
| 2014/0108247 A1 | 4/2014 | Artman et al. |
| 2014/0114776 A1 | 4/2014 | Solanki et al. |
| 2014/0143018 A1 | 5/2014 | Nies et al. |
| 2014/0229375 A1 | 8/2014 | Zaytzsev et al. |
| 2014/0244354 A1 | 8/2014 | Seifert |
| 2014/0310117 A1 | 10/2014 | Moshal |
| 2014/0344153 A1 | 11/2014 | Raj et al. |
| 2015/0046276 A1 | 2/2015 | Artman et al. |
| 2015/0095133 A1 | 4/2015 | Parker et al. |
| 2015/0095134 A1 | 4/2015 | Parker et al. |
| 2015/0269557 A1 | 9/2015 | Artman et al. |
| 2019/0295066 A1 | 9/2019 | Zaytzsev et al. |

FOREIGN PATENT DOCUMENTS

| | | |
|---|---|---|
| EP | 2954474 A2 | 12/2015 |
| EP | 2973322 A1 | 1/2016 |
| WO | 2011/112752 A1 | 9/2011 |
| WO | 2012/106757 A1 | 8/2012 |
| WO | 2012/135115 A2 | 10/2012 |
| WO | 2013/066910 A1 | 5/2013 |
| WO | 2013/091145 A1 | 6/2013 |
| WO | 2014/062229 A1 | 4/2014 |
| WO | 2014/062230 A1 | 4/2014 |
| WO | 2014/124395 A2 | 8/2014 |
| WO | 2014/124935 A1 | 8/2014 |
| WO | 2014/164228 A1 | 10/2014 |
| WO | 2015/048476 A1 | 4/2015 |

OTHER PUBLICATIONS

Keats et al. Bayesian inference for source determination with applications to a complex urban environment. Atmospheric Environment 41 (2007) 465-479. (Year: 2007).
EP Supplementary European Search Report for application 13846999.4 dated Apr. 4, 2016.
NFC, Security Risks of Near Field Communication, 2017, 1-2, retrieved on Sep. 28, 2021.
PCT International Preliminary Report on Patentability for application PCT/US2013/033145 dated Apr. 21, 2015.
PCT International Preliminary Report on Patentability for application PCT/US2013/033169 dated Apr. 21, 2015.
PCT International Preliminary Report on Patentability for application PCT/US2013/062389 dated Mar. 31, 2015.
PCT International Preliminary Report on Patentability for application PCT/US2014/015630 dated Aug. 11, 2015.
PCT International Preliminary Report on Patentability for application PCT/US2014/021387 dated Sep. 15, 2015.
PCT International Preliminary Report on Patentability for application PCT/US2014/057762 dated Mar. 29, 2016.
PCT International Search Report and written Opinion of the Intenational Searching Authority for application PCT/US2014/015630 dated Dec. 8, 2014.
PCT International Search Report and written Opinion of the Intenational Searching Authority for application PCT/US2014/021387 dated Jul. 7, 2014.
PCT International Search report and Written Opinion of the International Seaching Authority for application PCT/US2013/033145 dated Jun. 21, 2013.
PCT International Search Report and Written Opinion of the International Searching Authority for application PCT/US2013/033145 dated Jun. 21, 2013.
PCT International Search Report and Written Opinion of the International Searching Authority for application PCT/US2013/062389 dated May 27, 2014.
PCT International Search Report and Written Opinion of the International Searching Authority for application PCT/US2014/015630 dated Dec. 8, 2014.
PCT International Search Report and Written Opinion of the International Searching Authority for application PCT/US2014/021387 dated Jul. 7, 2014.
PCT International Search Report and Written Opinion of the International Searching Authority for application PCT/US2014/057762 dated Dec. 29, 2014.
PCT International Search Report for application PCT/US2013/033169 dated Jun. 10, 2013.
PCT Written Opinion of the International Searching Authority for application PCT/US2013/033169 dated Jun. 10, 2013.
Roberts, Paul F., Bluetooth—Sniffing Highway Traffic Monitors Vulnerable to MITM Attack, Dec. 3, 2012, the security ledger, 1-4, https://securityledger.com/2012/12/bluetooth-sniffing-highway-traffic-monitors-vulnerable-to-mitm-attack/, retrieved on Sep. 28, 2021.
U.S. Patent Application filed Feb. 11, 2013, U.S. Appl. No. 13/764,753.
U.S. Patent Application filed Sep. 27, 2012, U.S. Appl. No. 61/706,664.
U.S. Patent Application filed Oct. 13, 2017, U.S. Appl. No. 15/784,015.
U.S. Patent Application filed Oct. 17, 2012, U.S. Appl. No. 61/715,229.

(56) References Cited

OTHER PUBLICATIONS

U.S. Patent Application filed Oct. 17, 2012, U.S. Appl. No. 61/715,230.
U.S. Patent Application filed Oct. 22, 2012, U.S. Appl. No. 13/657,728.
U.S. Patent Application filed Aug. 7, 2014, U.S. Appl. No. 14/454,695.
U.S. Patent Application filed Mar. 11, 2013, U.S. Appl. No. 13/794,529.
U.S. Patent Application filed Mar. 12, 2013, U.S. Appl. No. 13/797,264.
U.S. Patent Application filed Jun. 2, 2016, U.S. Appl. No. 15/172,032.
Waveform, What causes weak cell phone signal and dropped calls?, 1-3, https://www.waveform.com/pages/causes-of-weak-signal, retrieved on Sep. 28, 2021.
U.S. Appl. No. 16/264,177, filed Jan. 31, 2019, U.S. Pat. No. 11,062,354, Issued.
U.S. Appl. No. 13/801,610, filed Mar. 13, 2013, U.S. Pat. No. 10,235,692, Issued.
R. Buyya, D. Abramson and S. Venugopal, "The Grid Economy," in Proceedings of the IEEE, vol. 93, No. 3, pp. 698-714, Mar. 2005. (Year: 2005).

* cited by examiner

CONSUMER PRESENCE BASED DEAL OFFERS

RELATED APPLICATIONS

This application is a continuation of U.S. patent application Ser. No. 16/264,177, filed Jan. 31, 2019, which is a continuation of U.S. patent application Ser. No. 13/801,610, filed Mar. 13, 2013, which claims the benefit of U.S. Provisional Patent Application No. 61/715,230, filed Oct. 17, 2012, which is incorporated herein by reference in its entirety.

FIELD

Embodiments of the invention relate, generally, to facilitating payments including promotional offers via a mobile device.

BACKGROUND

Financial transactions between merchants and consumers typically require the consumers to present a form of payment to the merchant. As a result, consumers may be required to keep wallets that include cash, credit cards, debit cards, deal vouchers, coupons, reward tracking cards, checks or other payment instruments that may be accepted by merchants and/or their devices used at the point-of-sale (e.g., point-of-sale devices, such as cash registers, credit card readers, etc.). In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, improve determining the presence of a consumer (which, as used herein, includes any type of user, including a passenger, shopper, merchant buyer, etc.) using a consumer device. More specifically, embodiments provided herein may include a central system that may be implemented to securely provide merchants (e.g., any user that may benefit by knowing more personal information about the consumer) a way to receive more personal, identifiable information about a consumer based on generic and/or otherwise anonymous data sent (e.g., automatically, in some embodiments) by a consumer's device over an unsecure transmission. In this regard, a merchant device can communicate directly with a consumer device in an efficient, but unsecure manner to obtain personal and/or other types of personally identifiable information over a secure network from a central system.

Some embodiments may provide for a merchant device. The merchant device may include processing circuitry configured to: wirelessly receive wallet identifying data from a consumer device; transmit the wallet identifying data to a central system; receive, from the central system, consumer identifying data associated with the wallet identifying data; and determine the consumer device is in proximity to the merchant device.

In some embodiments, the processing circuitry of the merchant device may be further configured to display consumer information based on at least some of the consumer identifying data. When the consumer device is no longer in proximity to the merchant device, the merchant device may be configured to cease displaying the consumer information. In some embodiments, the merchant device may be configured to receive an indication from a user (e.g., merchant) to only display consumer devices within a given range of the merchant device and cease displaying the consumer information after determining the consumer device is outside the given range.

In some embodiments, the processing circuitry of the merchant device may be configured to: receive product identifying data from the consumer device; and transmit the product identifying data to the central system. The merchant device may receive promotional information associated with the product identifying data from the central system.

In some embodiments, the processing circuitry of the merchant device may be further configured to wirelessly send a promotional offer to the consumer device. The promotional offer may be wirelessly sent in response to determining the consumer device is in proximity to the merchant device. In some embodiments, the processing circuitry of the merchant device may be further configured to: receive an indication that the promotional offer has been redeemed by the consumer device; generate redemption data indicating the promotional offer has been redeemed; and transmit the redemption data to the central system. The merchant device may be further configured to send a receipt to the consumer device indicating an applied discount associated with the promotional offer. In some embodiments, the wallet identifying data is associated with a payment account. For example, the applied discount could be an amount deducted from a total cost that is paid with the payment account.

Some embodiments may provide for a networked device. The networked device may be a part of a central system and may include processing circuitry configured to: receive consumer identifying data from a consumer device; generate wallet identifying data associated with the consumer identifying data; associate promotional data with the consumer identifying data, wherein the promotional data is also associated with a merchant; send the wallet identifying data to the consumer device; receive the wallet identifying data from a merchant device, wherein the merchant device is associated with the merchant; validate the wallet identifying data received from the merchant device; send the consumer identifying data to the merchant device after validating the wallet identifying data; send the promotional data.

In some embodiments, the processing circuitry of the networked device may be further configured to: receive a request to authorize a payment of a total amount, the total amount to be paid to the merchant by the networked device from a payment account associated with the consumer device; determine the promotional data is associated with a discount; process the request by applying the discount to the total amount and pay the remaining amount to the merchant from the payment account; and send a payment confirmation indicating payment of the total cost less the discount to the merchant device after processing the request.

In some embodiments, the processing circuitry of the networked device may be further configured to facilitate payment to a merchant account associated with the merchant device and/or retain a portion of the remaining amount as a fee for services provided to the merchant device.

In some embodiments, the processing circuitry of the networked device may be further configured to: determine when the consumer device is in proximity to the merchant device; and in response to determining when the consumer device is in proximity to the merchant device, send the promotional data to the consumer device and/or merchant device. The promotional data may be associated with a particular merchant and/or with merchants within a geofencing distance to the location of the consumer device.

Some embodiments may provide for a consumer device. The consumer device may include processing circuitry configured to: receive wallet identifying data from a central system; establish a connection with a merchant device; wirelessly transmit the wallet identifying data to the merchant device via the connection; and receive promotional data, wherein the promotional data is based at least in part on consumer information stored at the central system, the consumer information associated with the wallet identifying data transmitted by the consumer device.

Some embodiments may include one or more methods discussed herein. Other embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
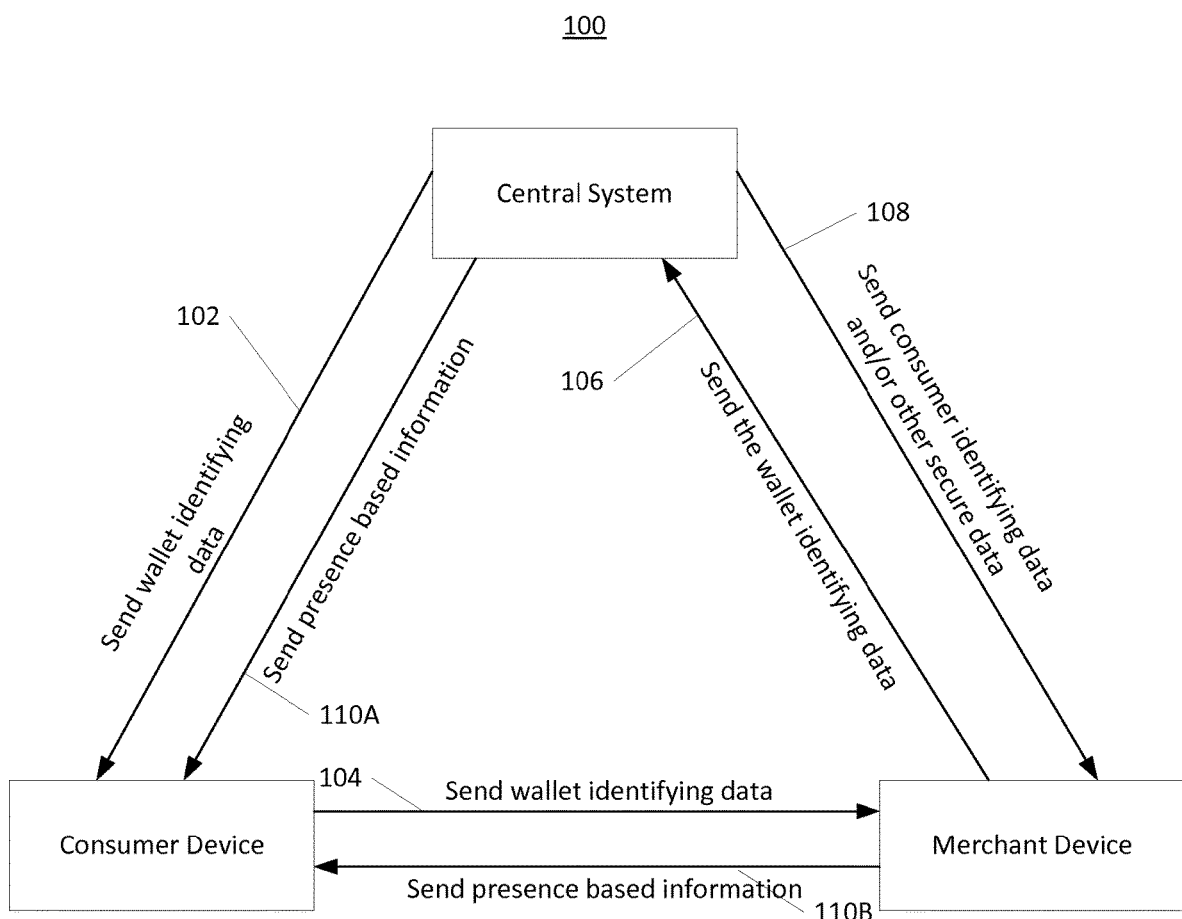
Figure 2A:
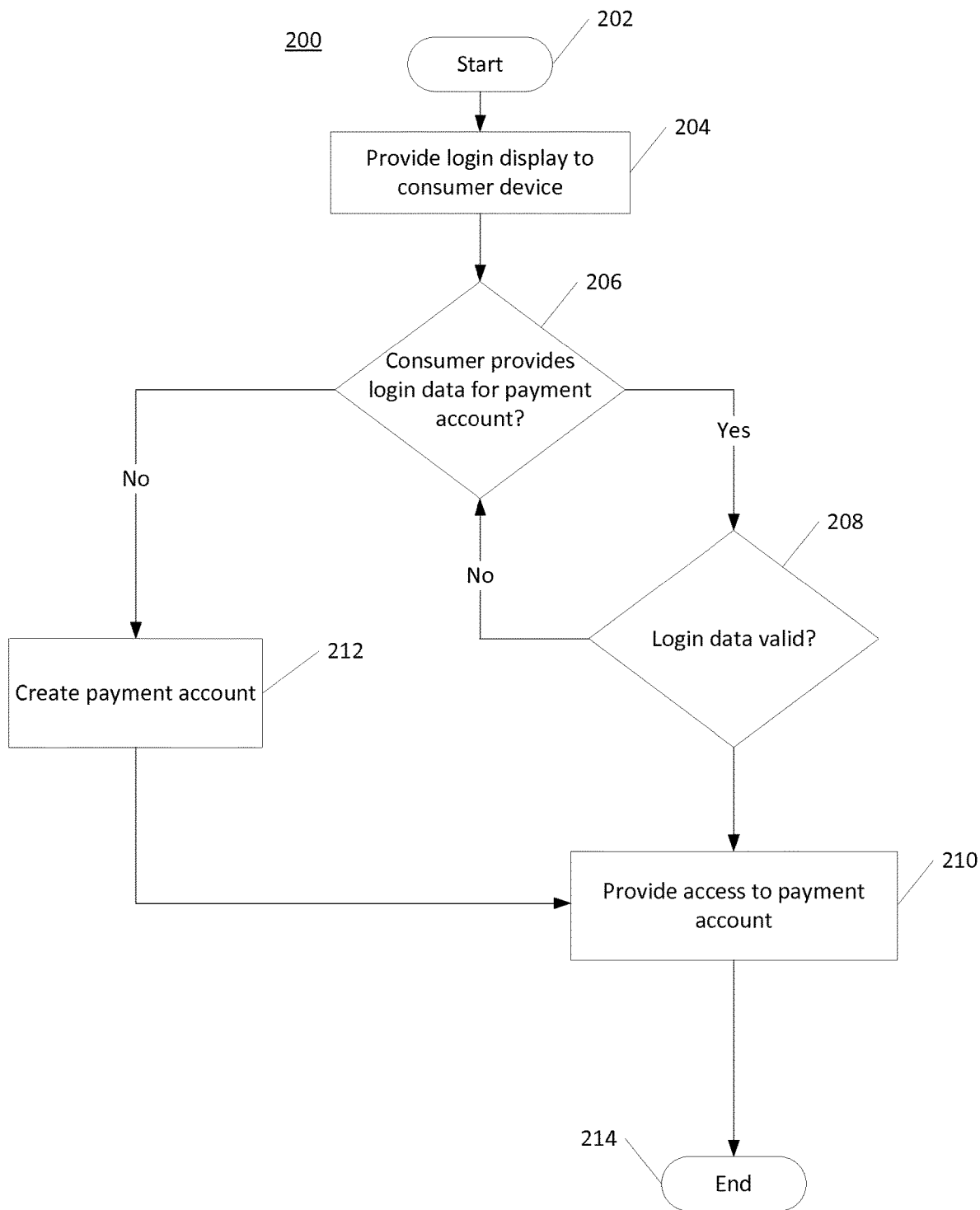
Figure 2B:
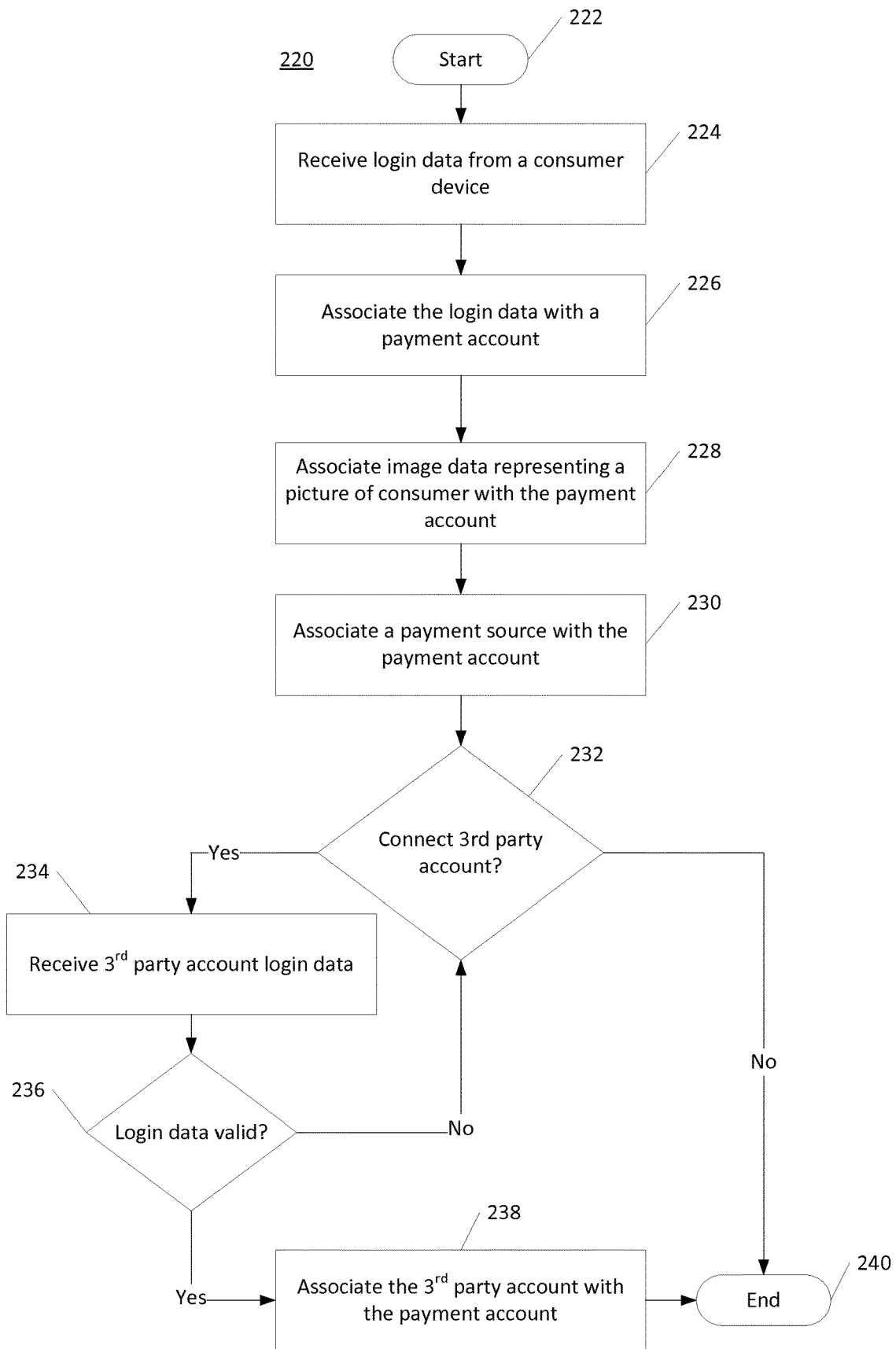
Figure 13:
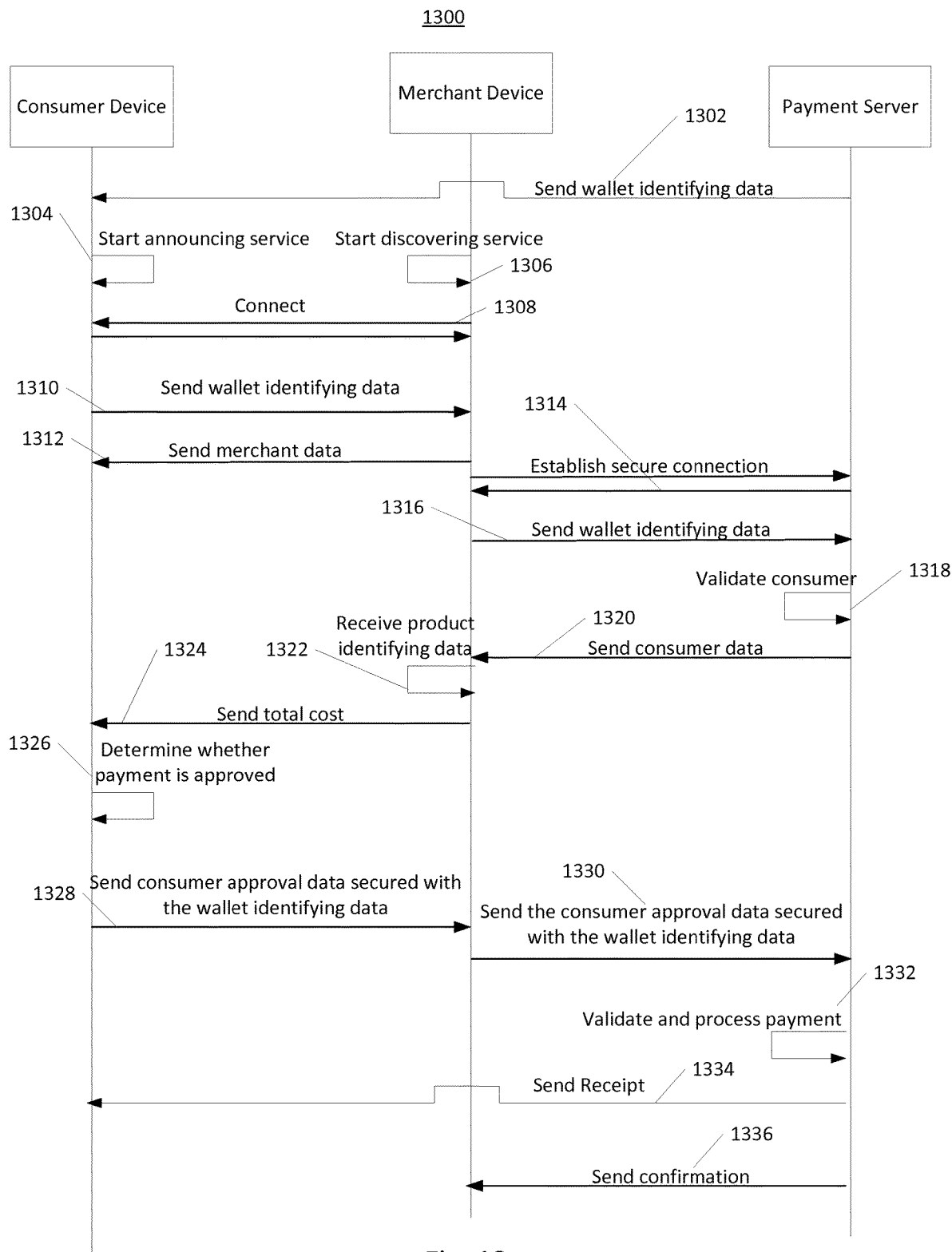
Figure 14:
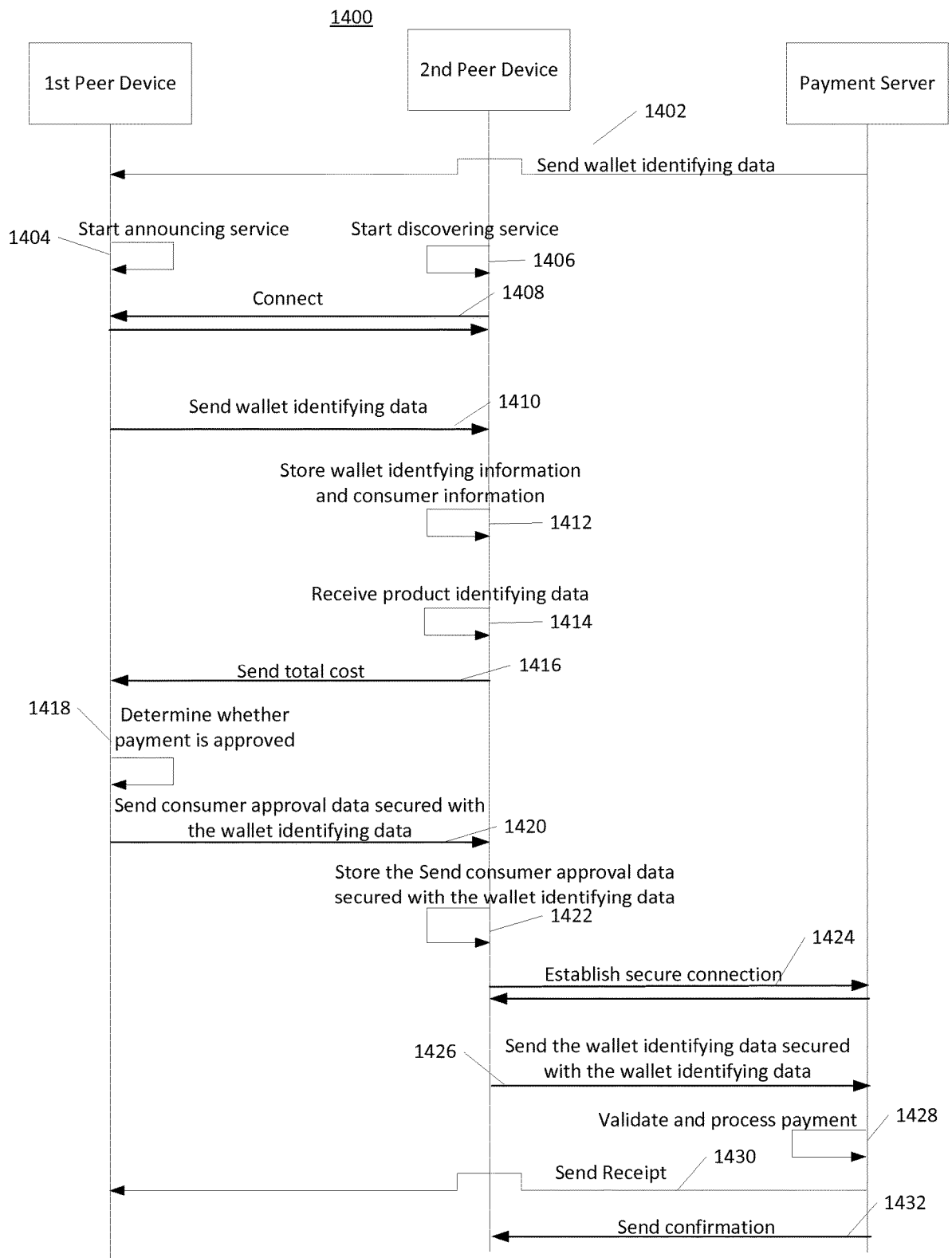
Figure 23:
Figure 24:
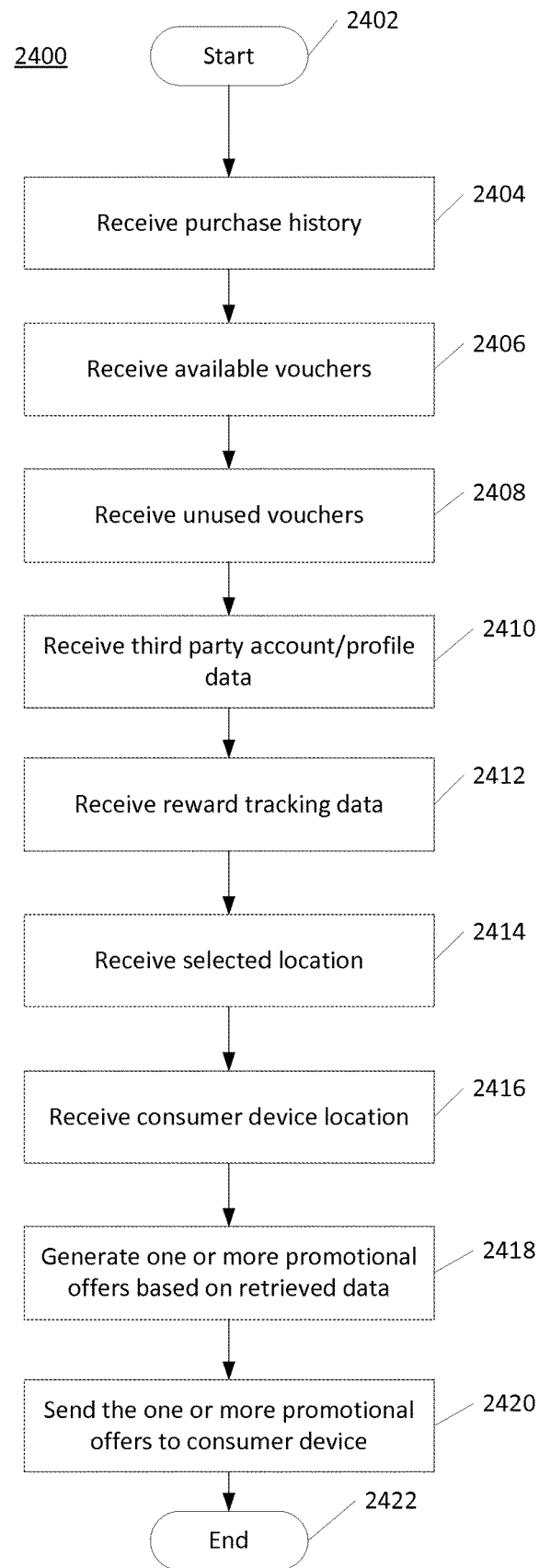
Figure 29:
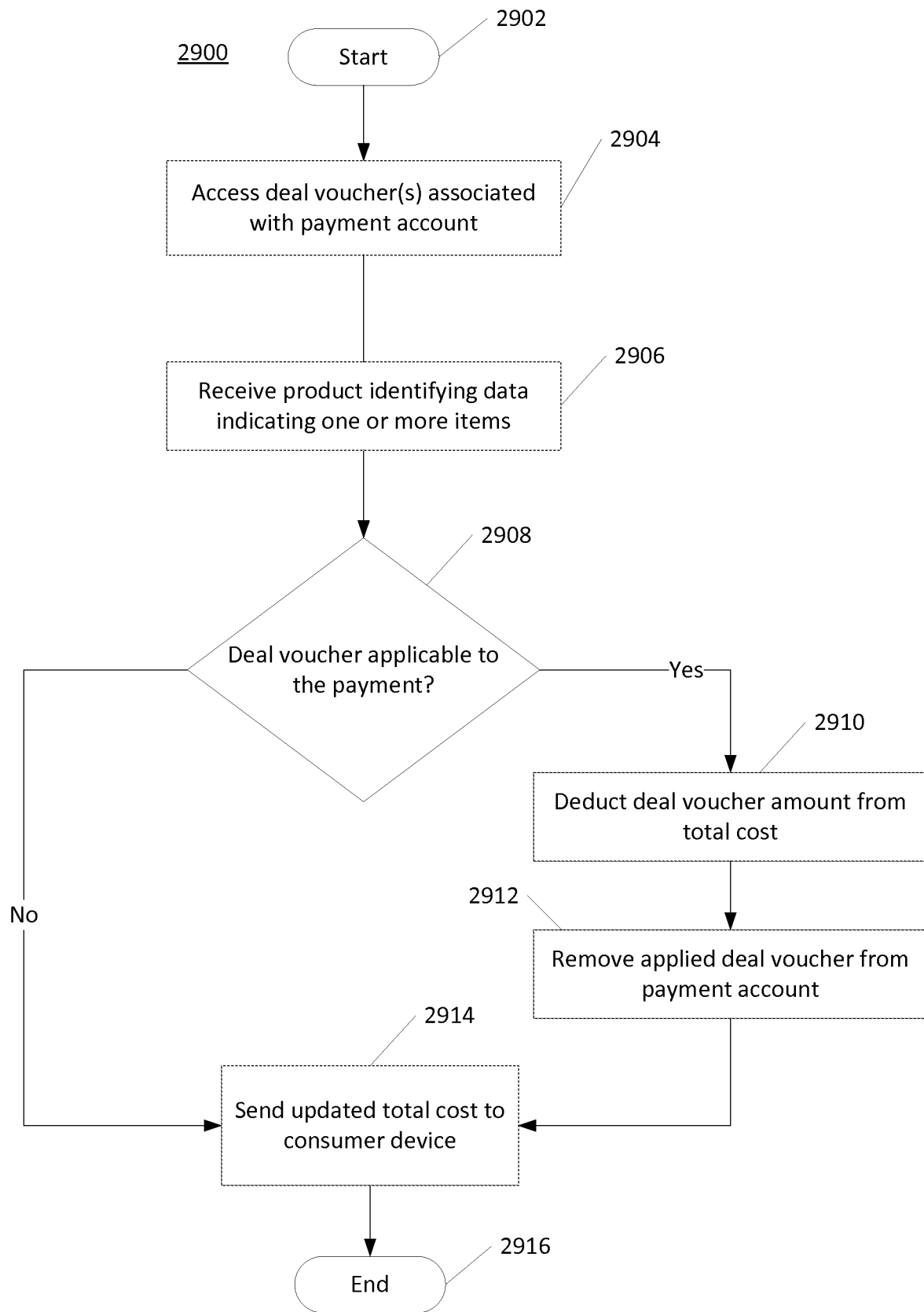
Figure 30:
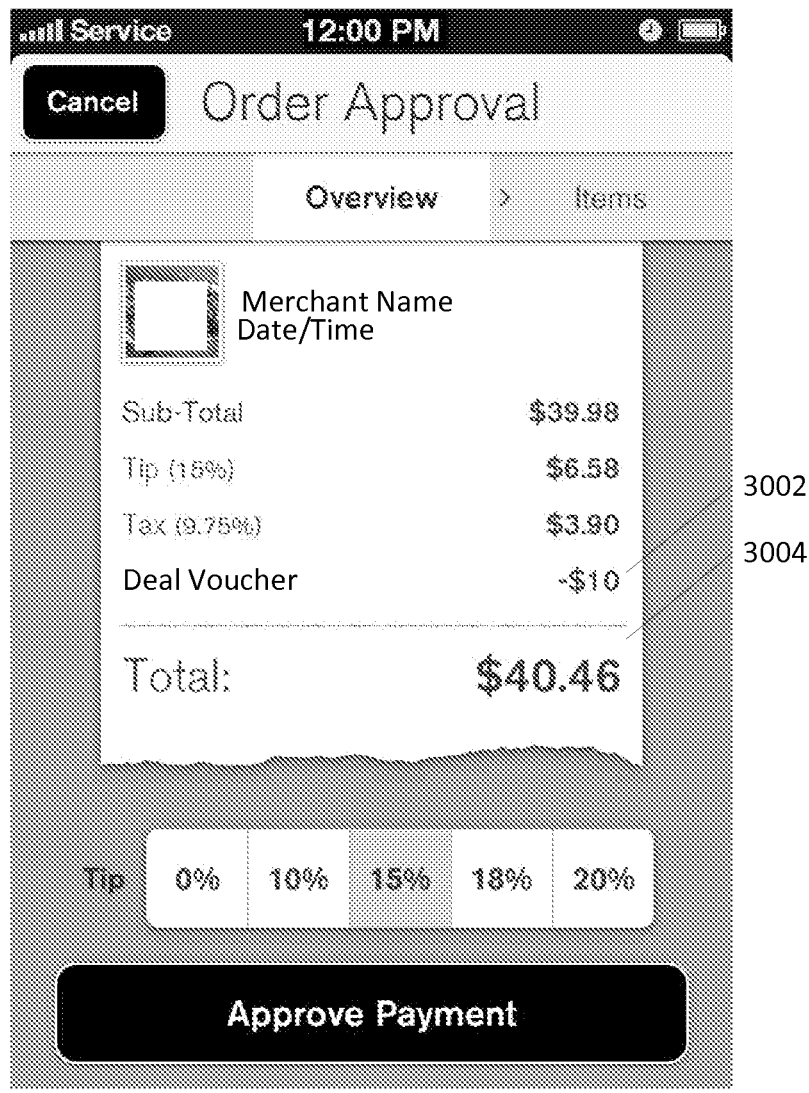
Figure 31:
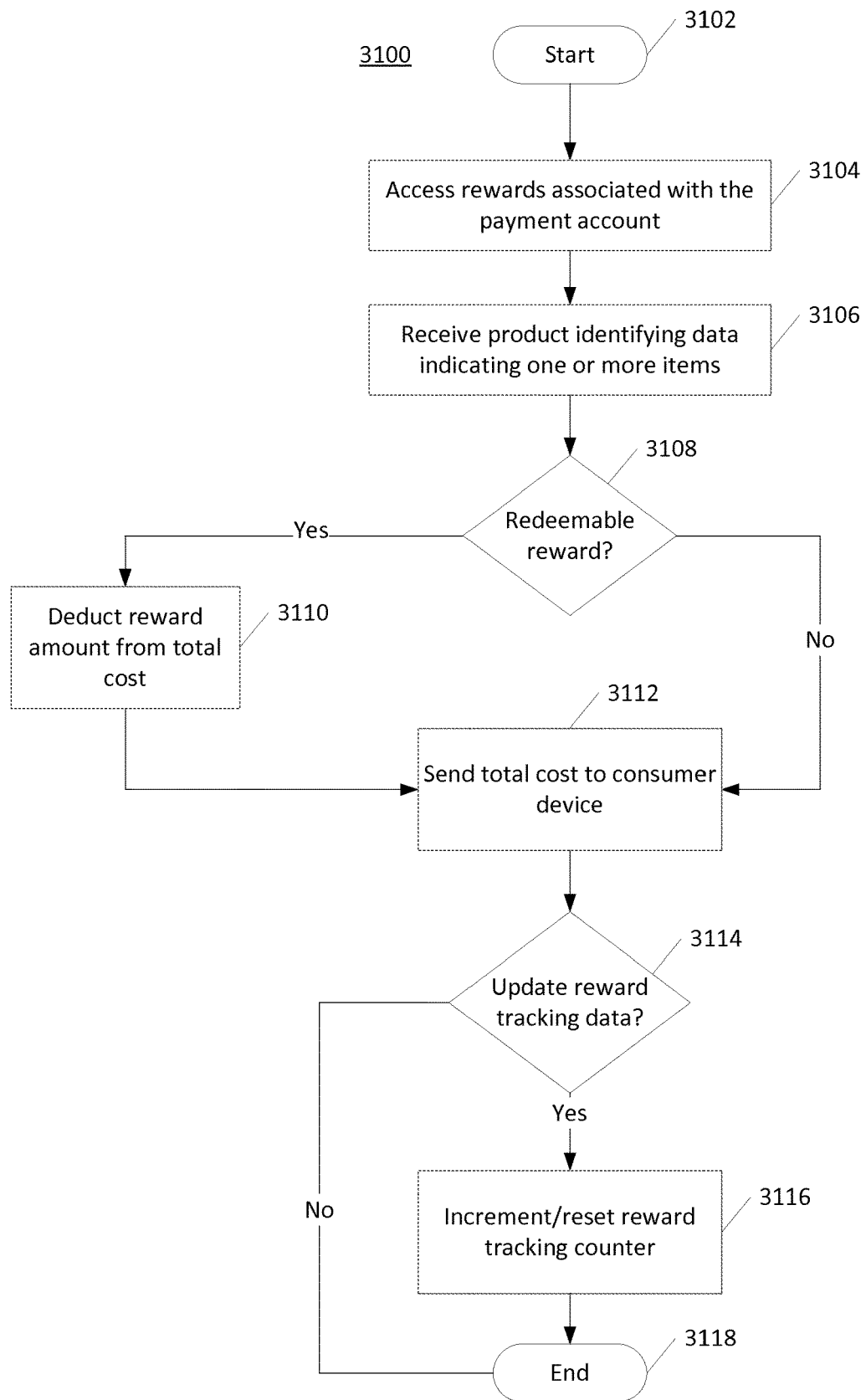
Figure 32:
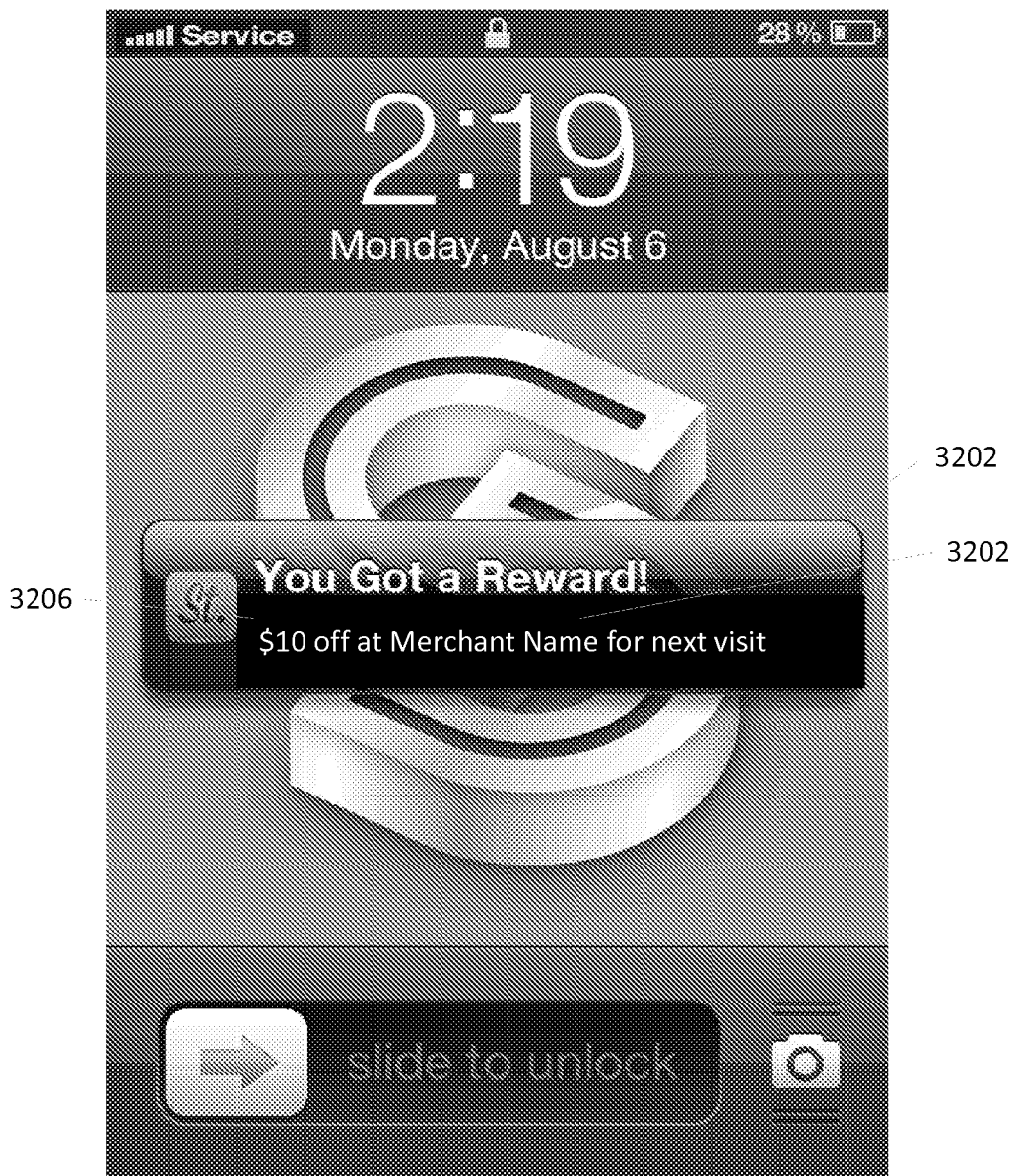
Figure 33:
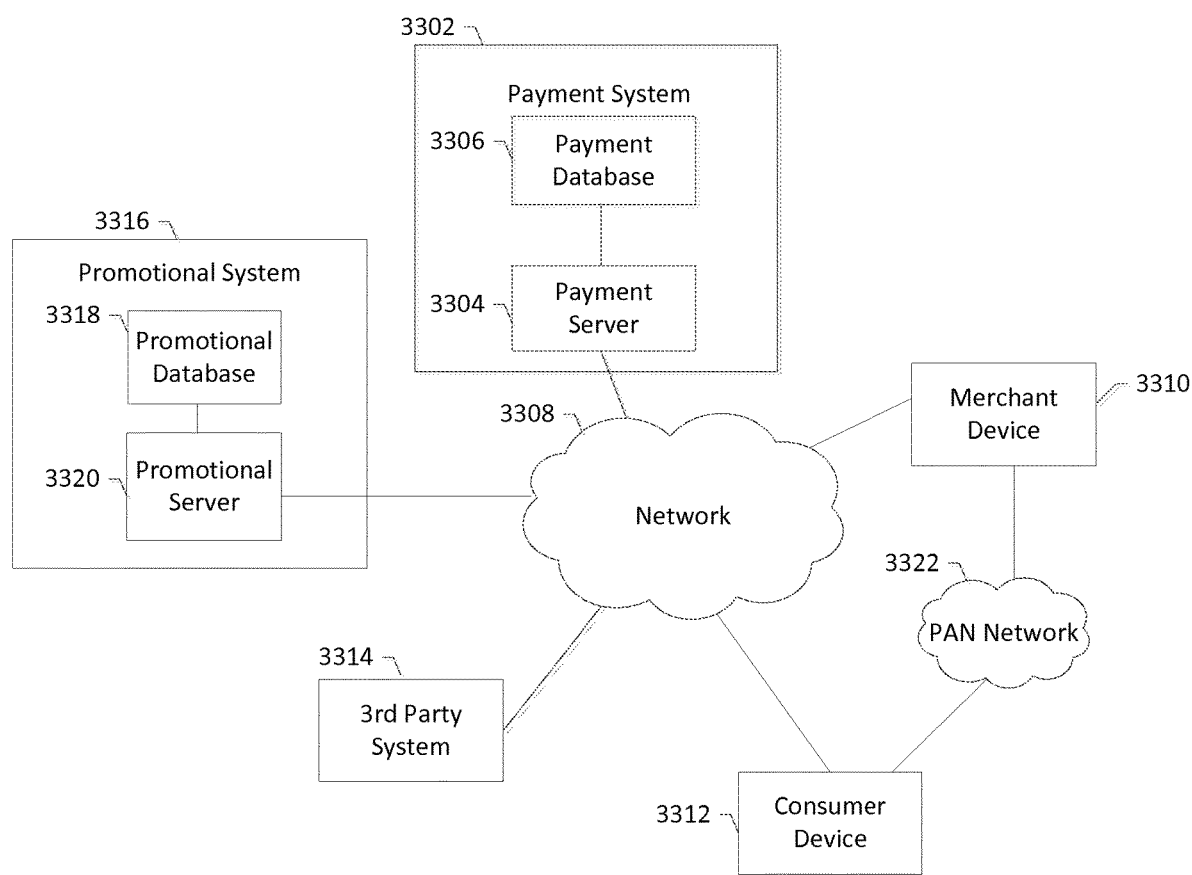
Figure 34:
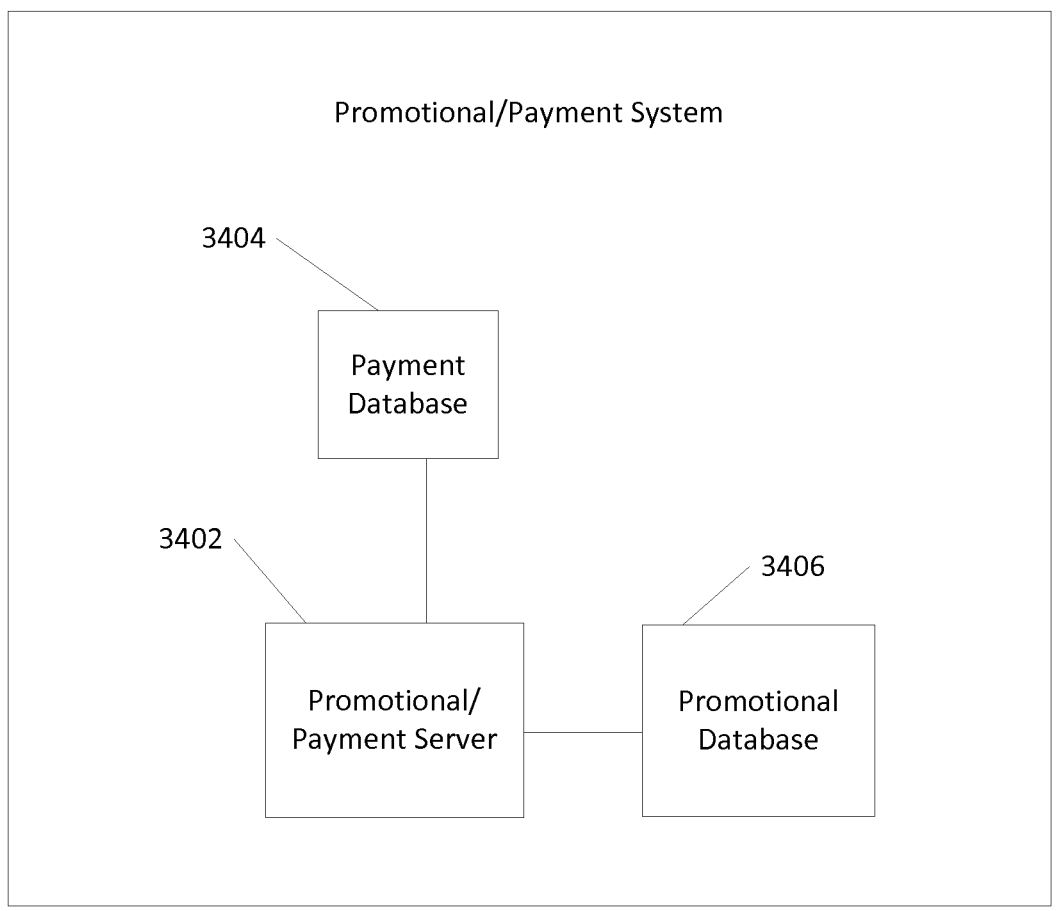
Figure 35:
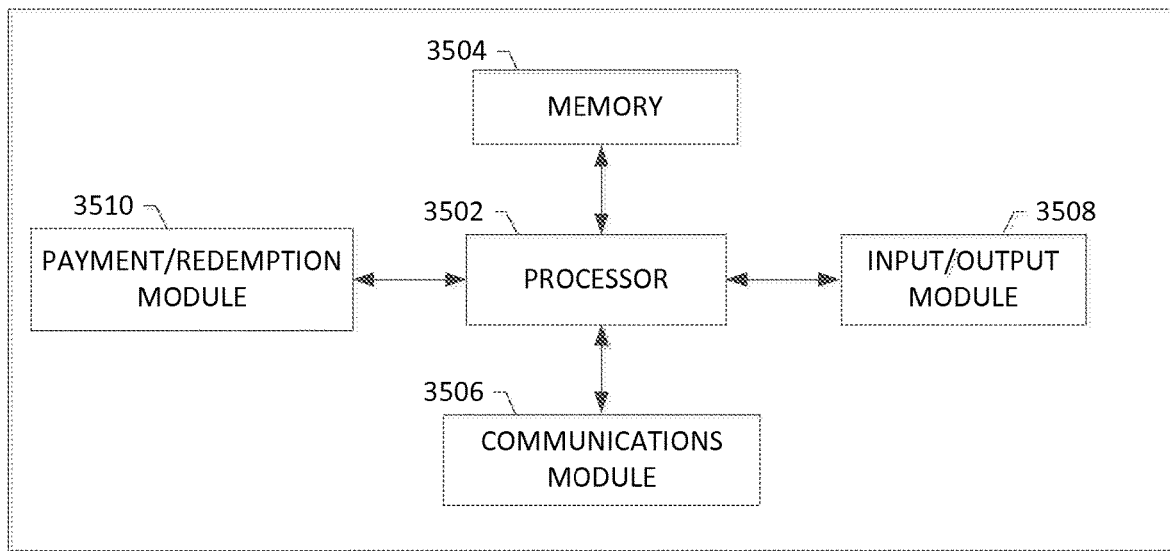

Having thus described some embodiments in general terms, reference will now be made to the accompanying drawings, which are not necessarily drawn to scale, and wherein:

FIG. 1 shows a flow chart of an example method for determining the presence of a consumer, performed in accordance with some embodiments;

FIG. 2a shows a flow chart of an example method for accessing a payment account, performed in accordance with some embodiments;

FIG. 2b shows a flow chart of an example method for creating a payment account, performed in accordance with some embodiments;

FIGS. 3-12 show example graphical user interface displays that may be presented by various components of systems, in accordance with some embodiments;

FIGS. 13 and 14 show flow charts of example methods for facilitating transactions, performed in accordance with some embodiments;

FIGS. 15-22 show example graphical user interface displays that may be presented by various components of systems, in accordance with some embodiments;

FIG. 23 shows an example graphical user interface display that may be presented by various components of systems, in accordance with some embodiments;

FIG. 24 shows a flow chart of an example method for providing a promotional offer, performed in accordance with some embodiments;

FIGS. 25-28 show example graphical user interface displays that may be presented by various components of systems, in accordance with some embodiments;

FIG. 29 shows a flow chart of an example method for providing a promotional offer, performed in accordance with some embodiments;

FIG. 30 shows an example graphical user interface display that may be presented by various components of systems, in accordance with some embodiments;

FIG. 31 shows a flow chart of an example method for providing a promotional offer, performed in accordance with some embodiments;

FIG. 32 shows an example graphical user interface display that may be presented by various components of systems, in accordance with some embodiments;

FIG. 33 shows an example system for providing an online orders, configured in accordance with some embodiments;

FIG. 34 shows an example system for providing payments and promotional offers, configured in accordance with some embodiments; and FIG. 35 shows an example schematic block diagram of circuitry, configured in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

An advantage that may be realized by some embodiments discussed herein is that when a consumer device enters the vicinity of or is otherwise within communicable range (sometimes referred to herein as being "in proximity") with a compatible merchant device, a local connection (e.g., via a personal area network ("PAN")) may be automatically created. The local connection allows the consumer device to communicate with the merchant device directly, without an active connection to the Internet or a central system. Based on the local connection, the merchant device may be configured to determine the consumer's identity, location, or other consumer information that can be used to generate a targeted promotional offer (e.g., a deal voucher purchase offer, deal voucher redemption, fee coupon, reward (such as points that may accumulate based on purchases), etc.).

To ensure that sensitive information is not passed via the local connection, the consumer device and the merchant device may be configured to share wallet identifying data (e.g., to identify the consumer and/or to secure payments). The wallet identifying data, like any other type of anonymous identifying data, can comprise, for example, one or more keys, random numbers, codes, and/or other types of tokens. Upon receiving the wallet identifying data from a consumer device, the merchant device may be configured to pass the wallet identifying data to the central system in exchange for consumer information. As such, the consumer information is not passed over the local connection from the consumer device to the merchant device. In some embodiments, if the merchant device does not have an active connection to the central system, the wallet identifying data received from the consumer device may be stored and later sent to the central system for additional processing (e.g., to complete a financial transaction, monitor consumers passing through a store and/or display, provide promotional offers, etc.).

Some embodiments discussed herein may be configured to provide payments via the consumer device (e.g., a mobile device). In this regard, some embodiments may free a consumer from having to carry any traditional payment instructions, such as credit cards, currency, checks, coupons, reward tickets, and/or other items typically stored in a physical wallet. Instead, the consumer may associate a payment account with the consumer device and make payments from the payment account simply by carrying and/or using the consumer device. For example, rather than hand a credit card and/or other tangible form of payment to a merchant, the consumer device may be configured to provide (e.g., automatically and/or in response to receiving a user indication to do so) the wallet identifying data to facilitate a payment of a certain amount to the merchant by the central system. Although many examples herein are related to the use of wallet identifying data used for payment-related functionality, any type of anonymous identifying data can be used to facilitate various presence based functionality in accordance with some embodiments of the present invention.

In some embodiments, one or more promotional offerings may be associated with a consumer's payment account (or a promotional account that is associated with the payment account) managed by the central system. In some embodiments, promotional offers may be automatically redeemed, rewarded, or otherwise processed when the consumer makes a payment with the payment account.

Some embodiments may provide for secure payments between the consumer device and a merchant device to protect merchants and consumers from unauthorized devices and/or fraudulent payments. For example, the central system may function as and/or otherwise include a payment server that is configured to facilitate the payment. The central system may generate and send the wallet identifying data to the consumer device and later validate payments based on wallet identifying data received from the consumer device via a merchant device.

Some other, but non-exhaustive, advantages that may be realized by some embodiments discussed herein include allowing a merchant to ensure that the consumer device user is in fact the real person authenticated to the consumer device, allowing payments between two peer devices, and/or facilitating customer service and point-of-sale functionality.

Presence Based Detection Overview

FIG. 1 shows a flow chart of an example method 100 for determining when a consumer is in the presence of a merchant device, in accordance with some embodiments. Method 100 is meant to show a high level example, while some of the other processes flows and other drawings discussed herein show more detailed examples. Further, once the consumer's presence is detected, various other functionality can be initiated and/or deactivated. For example, promotional offers may be sent to the consumer's device (e.g., to facilitate a transaction and/or "up-sell" the consumer additional goods/services) and/or offers may be blocked from being sent to the consumer's device (e.g., since the consumer is already in the store, there may be less of a need to offer a discount applicable to the store or other merchant shops). While other embodiments may operate differently, the examples discussed herein are largely focused on detecting the consumer's presence based on the consumer device being in communicable range with the merchant device. For example, both the consumer device and the merchant device may be running a Bluetooth-compliant protocol, such as Bluetooth v4, and/or may be configured to establish/join any other type of PAN.

At 102, a central system may be configured to send wallet identifying data to a consumer device. For example, the central system can be a marking system, coupon provider system, a payment system, and/or any other type of promotional system controlled by a merchant, third party and/or any other type of user (e.g., such as hardware provider, software application developer, online retailer, brick-and-mortar retailer, etc.).

The wallet identifying data can comprise, for example, one or more keys, numbers, codes, and/or other types of tokens that are randomly or otherwise generated and/or assigned. "Random," as used herein, may include pseudo-random and/or random generation and assignment schemes. The wallet identifying data may be used to encrypt, sign, and/or otherwise secure messages. As such, private information such as consumer data, merchant data, financial data, transaction data, and/or other sensitive, non-random data may be secured with the wallet identifying data.

For example, the wallet identifying data may be random data associated with the more sensitive, less random data, and the wallet identifying data can be transmitted over at least some types of communication links (e.g., unsecured or less secured wireless networks or direct connections) instead of the more sensitive, less random data. In some embodiments, a recipient, such as an authorized merchant device, can be configured to receive the wallet identifying data, communicate the wallet identifying data to the central system (which may be cloud-based), and receive the sensitive data securely (or at least more securely). For example, the wallet identifying data may provide the merchant device with access to consumer information via the central system in some embodiments. In some embodiments, the wallet identifying data may include a wallet identifying token and a private key. The wallet identifying token may be configured to be passed to other devices (e.g., a consumer device, a merchant device, a central system, etc.) to validate or authenticate various types of data. For example, the wallet identifying token may be passed to the merchant device, where the merchant device may be configured to share the wallet identifying token with the central system to receive consumer information.

The private key may be used by the central system to correlate a wallet identifying token with consumer identifying data and to validate and/or otherwise verify secured payment approval data such that the data may be relied upon as authentic and, thus, processed or otherwise used. The private key may be kept secret by the central system and/or securely shared with only devices (e.g., consumer devices) authorized to use wallet identifying tokens and private keys. In some embodiments, a wallet identifying token and a corresponding private key may be generated together and/or mathematically related such that determining the private key from the wallet identifying token (and vice versa) is very difficult, if not impossible, and extremely time consuming or prohibitively expensive.

In some embodiments, the consumer device can be configured to send the wallet identifying data it receives from the central system at 102 at some and/or all times. For example, the consumer device may be a smart phone that is configured to download an application from the central system (e.g., an online store of smart phone applications), and the downloading of the application can cause the consumer device to receive the wallet identifying data. Whenever the consumer device is running the application, the consumer device can be configured to broadcast and/or otherwise send wallet identifying data at 104. The link between consumer device and the merchant device used to send the wallet identifying data can be an unsecure or other type of connection (such as a Bluetooth connection, public WiFi connection, near field communication connection, etc.).

In some embodiments, the merchant device will only receive the wallet identifying data from the consumer device at 104 when the consumer device is in communicable proximity with the merchant device. Hence, when the merchant device receives the wallet identifying data from the consumer device, the merchant device and/or the central system can be configured in such embodiments to determine that the consumer device is in the presence of the merchant device. For example, the consumer may walk into a store while carrying the consumer device with an application running that causes the consumer device to send wallet identifying data. The consumer device may be configured to connect with one or more merchant devices at 104, such as via a personal area network (e.g., using Bluetooth) when the consumer device comes within a communicable range to a merchant device. In some embodiments, the consumer device and the merchant device may communicate via the connection and perform payments without requiring that the consumer device have an active connection to the central system (e.g., via the Internet).

When the merchant device has a connection to the central system, the merchant device may be configured to send the wallet identifying data to the central system at 106. For example, the merchant device and the central system may have a secure (or at least more secure) connection than that between the consumer device and the merchant device.

At 108, the central system can send consumer identifying data (e.g., image data, consumer name, account information, preference related information, etc.) and/or any other type of consumer-related information to the merchant device. As discussed below, this information can be based on data uploaded directly from the consumer's device(s) to the central system and/or collected based on the consumer's interactions with the merchant device and/or other devices, such as with the central system.

In addition to or instead of a central system that is also a promotional system and/or payment system (as discussed in the examples below), any other system could be used in accordance with some embodiments. For example, a government system used for airplane ticketing could be used to securely identify the presence of ticketed airline passenger. As yet another example, an amusement park or cruise ship may use some embodiments to identify the presence of customers. Accordingly, the examples provided herein are not meant to be limiting and some embodiments can be applied to other types of systems where knowing more information about, such as the identity of, a person that is present would be advantageous.

Upon receiving the data sent at 108, the merchant device can be configured to display at least some information about the consumer associated with the consumer device (e.g., based on a user name and/or password needed to log into the application running on the consumer device that causes the sending of wallet identifying data). As such, this is one example of how the merchant device can provide information about the consumer when the consumer is in the presence of the merchant device.

After the presence of the consumer is determined, the central system can be configured to send presence based information at 110A the consumer device. For example, the central system can determine what department of a store the consumer device is located and send a deal offer related to the consumer's location. For example, if the consumer is in the shoe section, a coupon for a particular brand of shoes can be provided to the consumer device based on the information received from the merchant device. For example, when sending the consumer identifying data at 108, the merchant device may also or instead send information indicating the department the merchant device is located, among other potentially relevant data. As another example, the central system can be configured to send an offer for goods sold in another department across the store in effort to cause the consumer to walk through the entire store (even if the consumer's primary intention for going to the store was to buy shoes). For example, a deal offer on camping may be provided to a consumer if the outdoor department is located across the store. As another example, the presence based information can be based on a transaction that is completed by the consumer. For example, the consumer may purchases skiing equipment and, in response to determining where the purchase took place, the system can be configured to provide the consumer an upsell deal offer, such as for a discount on ski lift tickets at a local mountain.

Additionally or alternatively, the merchant device can be configured to send presence based information to the consumer at 110B. The presence based information sent at 110B can be the same as or similar to that sent at 110A in substance. The presence based information sent at 110B can be generated by the merchant device and/or generated by the central system and relayed through the merchant device. In some embodiments, the consumer device and/or the merchant device can be configured to control what types of presence based information is received and/or sent.

Payment Account Access and Creation

FIG. 2a shows a flow chart of an example method 200 for accessing a payment account, performed in accordance with some embodiments. Method 200 will be described with reference to example displays 300-1200 shown in FIGS. 3-12, respectively.

FIGS. 3-12 show example displays 300-1200 that may be presented by one or more display screens of one or more machines, such as those used by consumers, which are sometimes referred to herein as "consumer devices," in accordance with some embodiments discussed herein. For example, the displays may be presented to a consumer (e.g., a user that makes payments) by a mobile device and/or a stationary device. Example mobile devices may include a cellular telephone (including smart telephones and/or other types of mobile telephones), laptop, tablet, and/or the like. Additionally or alternatively, a consumer may access displays 300-1200 and 1400-2200 via a stationary device, such as a desktop computer, work station, POS device, and/or any other type of device. FIGS. 15-22, 25-28, 30 and 32 are additional example displays, namely displays 1500-2200, 2500-2800, 3000 and 3200, which may be presented by one or more display screens included in one or more consumer devices.

FIG. 23 shows an example display 2300 that may be presented by one or more display screens of one or more machines, such as those used by merchants, sometimes referred to herein as "merchant devices." Any number of staff members employed by a merchant may have access to merchant devices, and, as such, the term "merchant" is sometimes used herein to describe any user representing the merchant and/or any other person who receives payment from another person, namely the consumer. Like consumer devices, merchant devices may include stationary devices and/or mobile devices. Additional examples of merchant devices and consumer devices are discussed in connection with FIGS. 33 and 35.

In some embodiments, any physical device may be configured to perform the functionalities described herein with respect to both merchant devices and consumer devices. For example, a device may be configured to make a payment (e.g., like a consumer device) and also receive a payment (e.g., like a merchant device).

In some embodiments, the displays 300-1200, 1500-2200, 2300, 2500-2800, 3000 and 3200 may be accessed via an application that executes locally and causes a merchant/consumer device to be configured to function as a specialized machine. Additionally or alternatively, cloud-based, multi-tenant, thin-client, and/or other types of online service techniques may be used. For example, the displays may be provided by one or more applications that execute on a remote device, such as a server and/or other networked machine. User input information may be generated by and sent from the merchant/consumer device to the remote device, while visual and/or audio information is sent from the remote device to the device.

Figure 3:
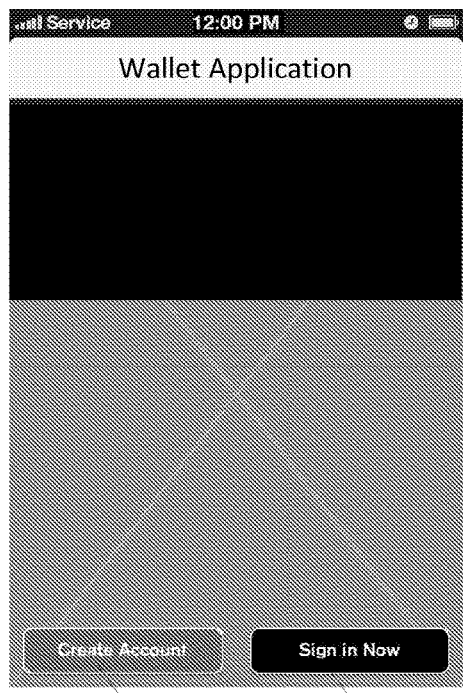

Turning back to FIG. 2a, method 200 shown therein may start at 202 and proceed to 104, where the central system (e.g., payment server 3304 or promotional server 3320 shown in FIG. 33 and/or promotional/payment server 3402 shown in FIG. 34) may provide a login display to a consumer device. For example, FIG. 3 shows login display 300 that may be displayed by/to a consumer device (e.g., consumer device 3312 shown in FIG. 33). Login display 300 may be accessed by virtually any method, such as an application executed by the consumer device. Alternatively and/or additionally, login display 300 may be accessed via a web browser, such as by entering an address (e.g., a uniform resource locator ("URL") address) into the web browser's location bar. Login display 300 may be configured to allow a user to create a payment account and/or sign in to a payment account. As such, login display 300 may include create account selection 302 and sign in selection 304.

Figure 4:
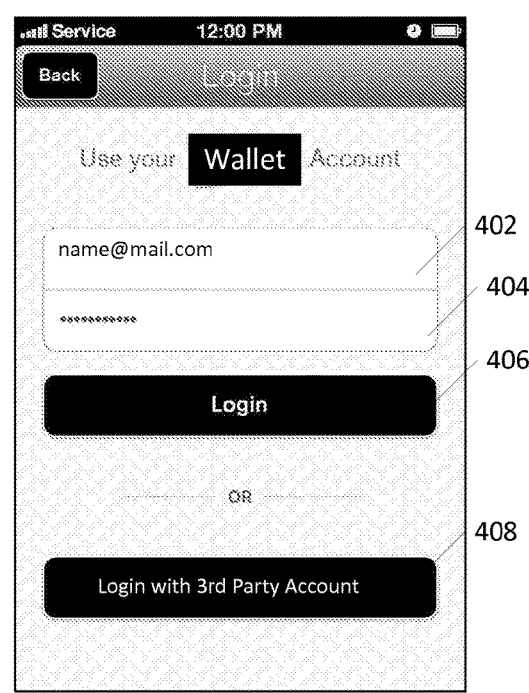

At 206, the central system may be configured to determine whether the consumer has provided login data for the payment account. For example, the consumer may select sign-in selection 304 in login display 300 to indicate a desire to sign-in with a preexisting payment account. In response, the consumer device may be configured to accept login data (e.g., a username, password, biometric identifier, etc.) for the payment account. For example, login input display 400, as shown in FIG. 4, may be configured to accept the login data in some embodiments. The consumer may enter a username to username field 402, a password to password field 404, and submit the payment (e.g., to the one or more servers) by selecting login selection 406.

If the consumer provides login data at 206, method 200 may proceed to 208. At 208, the central system may be configured to determine whether the login data is valid. For example, the login data received from the consumer device may be compared with login data stored in one or more databases (e.g., payment database 3302 and/or payment database 3404, shown in FIGS. 33 and 34, respectively).

In some embodiments, the central system may be configured to determine whether the consumer has provided third party login data for a third party account. For example, the consumer may select third party login selection 408 in login input display 400, which may allow the user to enter the third party login data (e.g., a username and password for the third party account).

The third party account may be any type of account that is provided by one or more third party servers (e.g., third party system 3312 shown in FIG. 33). As will be discussed in greater detail with respect to FIG. 2b, the consumer may associate one or more third party accounts with the payment account, allowing the consumer to access the payment account via the third party account (e.g., by logging in and/or otherwise authenticating with third party login data). Example third party accounts may include an email account, a social networking account, an account provided by a merchant, a banking account, etc.

If the consumer provides the third party login data, a determination may be made as to whether the third party login data is valid at 208. For example, the central system may be configured to send the third party login data to an appropriate third party server/system (e.g., with a login request). The central system may be further configured to receive an indication regarding whether the login data is valid or invalid in response. As such, some embodiments may allow the consumer to access the payment account via one or more different third party accounts and associated third party login data.

If the login data is determined to be valid at 208, method 200 may proceed to 210, where the central system may be configured to provide access to the payment account. As will be discussed in greater detail, the consumer device may be configured to, among other things, make payments via the payment account, associate one or more payment sources with the payment account, purchase and/or redeem promotional offers with the payment account, and/or view receipts of payments after receiving access to the payment account.

If the login data is determined to be invalid at 208, method 200 may return to 206 where a determination may be made as to whether the consumer wants to make another attempt at providing login data for the payment account. In some embodiments, the payment account (e.g., as identified by username field 202) may be locked out after a certain number of unsuccessful login attempts.

Returning to 206, if the consumer does not provide login data, method 200 may proceed to 212. At 212, the central system may be configured to allow the consumer to create a payment account. As discussed above, the consumer may select create account selection 302 at login display 300. Responsive to the selection, the central system may be configured to provide interfaces (e.g., displays 500-1200 shown in FIGS. 5-12) to the consumer device for creating the payment account, which will be described in further detail with respect to example method 220 shown in FIG. 2b. After creating the payment account, the consumer device may be allowed to access the payment account using method 200. Method 200 may end at 214.

Figure 5:
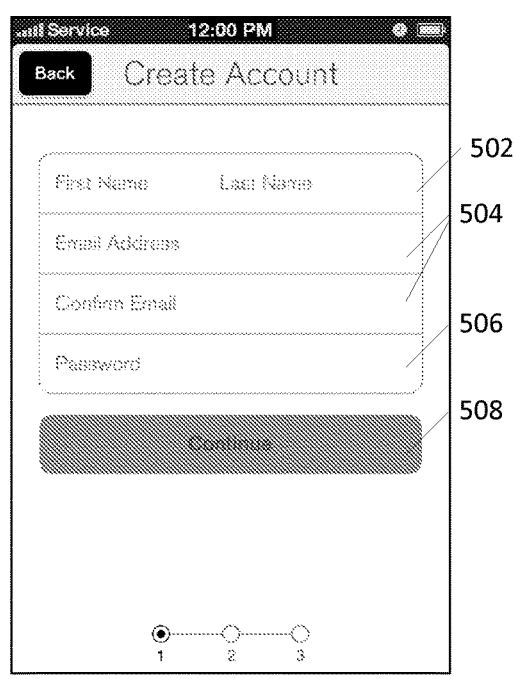
Figure 6:
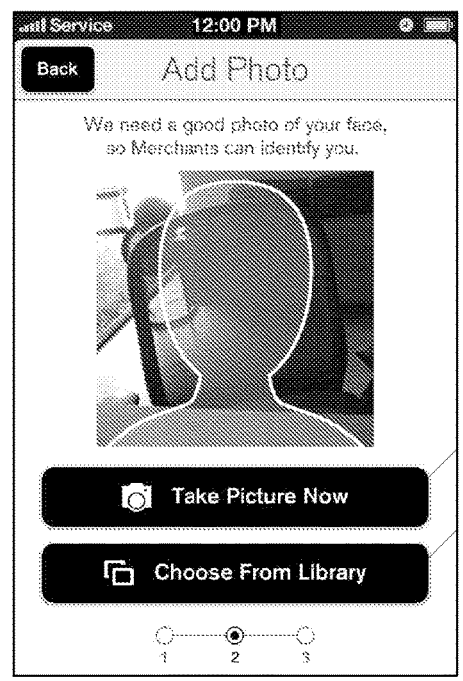

FIG. 2b shows a flow chart of an example of a method 220 for creating a payment account, performed in accordance with some embodiments. Method 220 may begin at 222 and proceed to 224, where login data (e.g., a username and password) for the payment account may be received from the consumer device. FIG. 5 shows an example create account display 500 that may be presented by the consumer device. Create account display 500 may include name field 502, email address fields 503, and password field 504. In some embodiments, an email address entered into email address fields 503 may be used as the username for the payment account (e.g., at username field 402, as shown in FIG. 4). Alternatively and/or additionally, the consumer may enter a username that is different from the email address that may be used for login. The consumer device may be configured to send the login data to the one or more servers responsive to the consumer selecting continue selection 508.

At 226, the login data received from the consumer device may be associated with a payment account. For example, associations between the login data may be stored in the one or more databases (e.g., payment database 3306 and/or payment database 3404). As such, the consumer may provide the login data to receive access to the payment account and/or associated data.

At 228, image data representing a picture of a consumer may be associated with the payment account. For example, the consumer device may be configured to display add photo display 600 responsive to the consumer selecting continue selection 508 in create account display 500. In some embodiments, the consumer device may include and/or otherwise be configured to control an image capturing device. The image capturing device may be any device configured to be able to capture the image data, such as a camera, a webcam, video recorder, etc. As such, the consumer device may be configured to allow the consumer to capture the image data by selecting take picture selection 602. Additionally and/or alternatively, the consumer may be allowed to choose existing image data (e.g., an image taken at an earlier time and stored) for association with the payment account, such as by selecting upload image selection 604.

Figure 7:
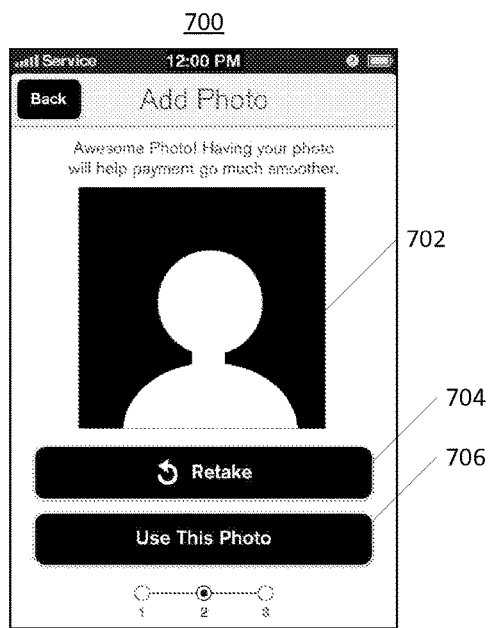

FIG. 7 shows an example confirm photo display 700 that may allow the consumer to review captured and/or existing image data, in accordance with some embodiments. For example, the image data may be shown at consumer image display 702. If the image data is unsatisfactory, the consumer may select retake selection 704. In some embodiments, the consumer device may be configured to display add photo display 600 in response. If the image data is satisfactory, the consumer may select use photo selection 706. The consumer device may be configured to send the image data to the one or more servers responsive to the selection.

Returning to FIG. 2b, at 230, the one or more servers may be configured to associate one or more payment sources with the payment account. In some embodiments, a payment source may be a financial payment account, such as a credit account, a checking account, a debit account, a third party payment account, a savings account, a bank account, or the like. In that sense, a "payment source," as used herein, may refer to any type of account capable of being associated with a currency balance (e.g., dollars, credits, etc.), providing a payment that decreases the balance, and/or receiving a payment that increases the balance.

Figure 8:
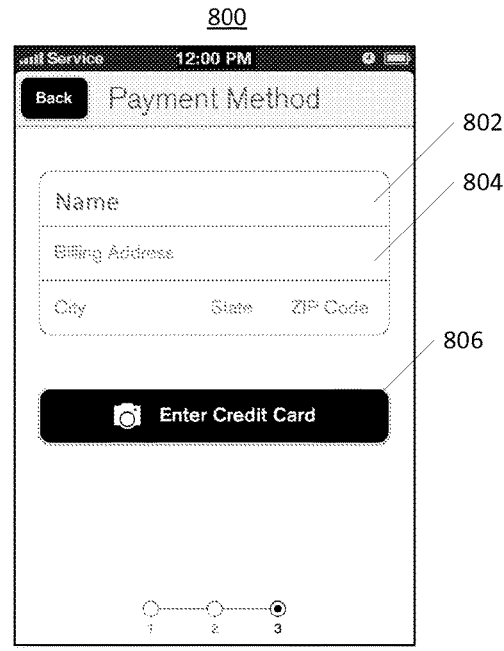
Figure 9:
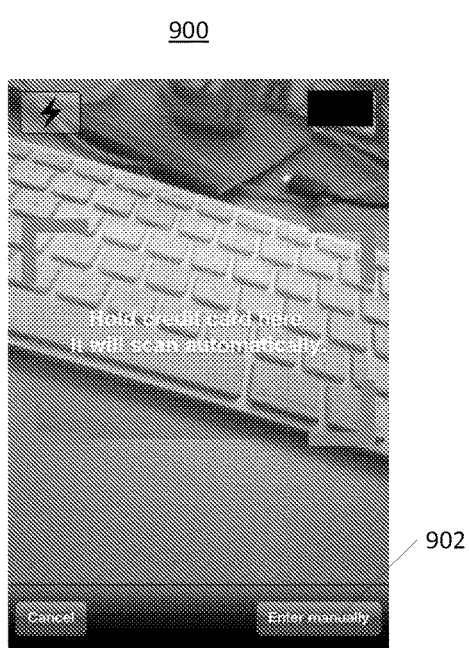

FIG. 8 shows an example add payment source display 800 that may allow the consumer device to send the one or more payment sources to the one or more servers, in accordance with some embodiments. The consumer may enter a name and billing address at 802 and 804, respectively. The consumer may further select enter credit card selection 806, which may allow the consumer to enter a credit card as a payment source. It is appreciated that credit cards and/or credit card account numbers are only an illustrative example, and that the techniques disclosed herein may be applicable to other types of payment sources, including checking account numbers, debit account numbers, savings account numbers, and/or any other account number that may have value and/or a value associated therewith to be used for payment.

Upon selecting enter credit card selection 804, the consumer device may be configured to allow a user to scan a credit card. For example, a consumer may hold a credit card to an image capturing device that may be configured to capture the credit card as image data, as shown in credit card capture display 900 in FIG. 9. The image data may be processed (e.g., using optical character recognition ("OCR") to extract a credit card number, expiration date and/or credit verification value (or "CVV"). One example of software that may provide credit card capturing and data extraction with a mobile device camera is card.io. It is appreciated, however, that any technique for reading credit card data may be used. For example, a barcode reader device that may read credit card data when the consumer swipes a credit card through the magnetic stripe reader device may be used in addition, or alternatively, to the image capturing device.

Figure 10:
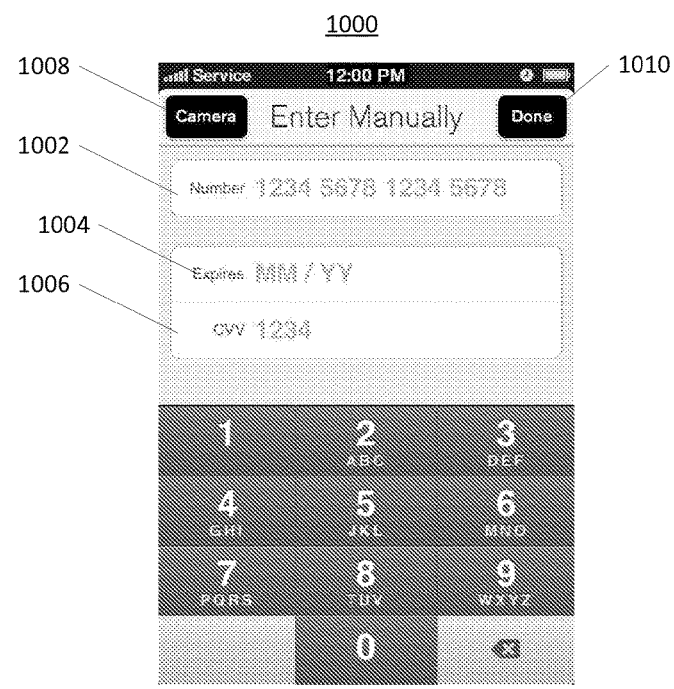

Additionally and/or alternatively, the consumer may select enter manually selection 902, which may cause the consumer device to display manual entry display 1000, as shown in FIG. 10. The consumer may enter a credit card number at 1002, the expiration date at 1004, and the CVV at 1006. In some embodiments, extracted credit card data from the image data may be used to automatically populate these fields, allowing a consumer to correct any mistakes (e.g., an OCR error). The consumer may return to credit card capture display 900 via camera selection 1008. The consumer may also submit the entered credit card data by selecting submit selection 1010.

Figure 11:
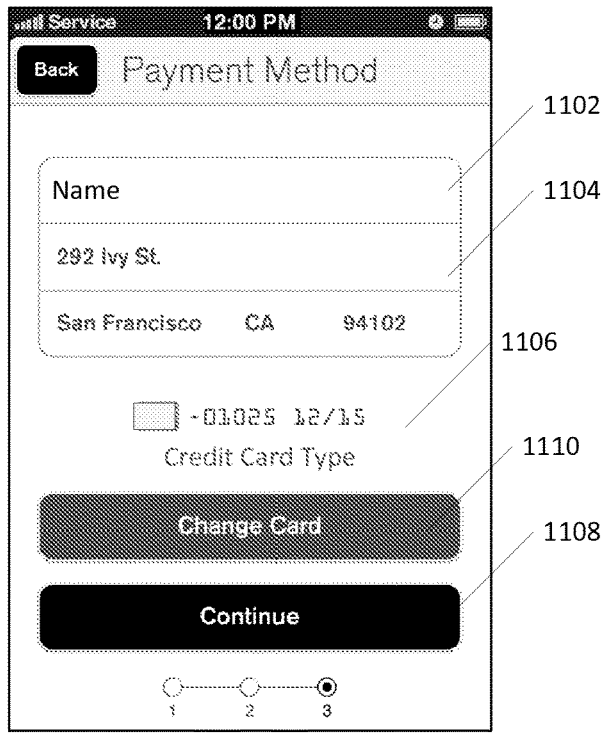
Figure 12:
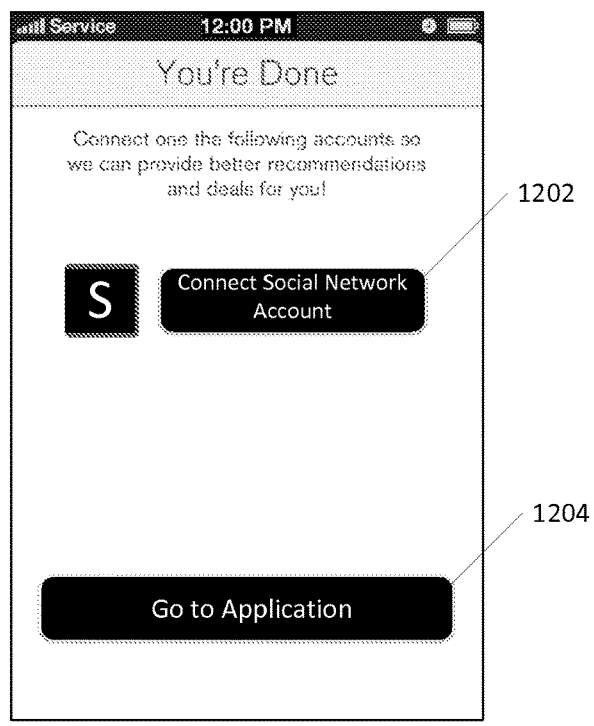

FIG. 11 shows an example confirm payment source display 1100, in accordance with some embodiments. Confirm payment source display 1100 may be shown, for example, after the central system has validated the credit card data. The consumer may add a payment source and/or replace the credit card data with a different payment source, such as by selecting change card selection 1110. The consumer may also indicate that the name at 1102, billing address at 1104, and/or credit card data at 1106 is correct by selecting continue selection 1108.

Returning to FIG. 2b, at 232, the central system may be configured to make a determination as to whether to account one or more third party accounts to the payment associate. In some embodiments, connecting a third party account may allow a user to login to the payment account via the third party account, as discussed above at 206 of method 200. Additionally and/or alternatively, third party account data (e.g., user profile, purchase history data, social network data, etc.) may be used to generate tailored recommendations for products, services, merchants, discounts, promotional vouchers, or the like that may be presented to the consumer device. For example, the consumer may use third party account connection display 300 associate a third party account (e.g., a social network account) by selecting connect account selection 1202.

At 234, the consumer device may be configured to prompt the consumer for third party login data, which may be received by the central system. The central system may be configured determine whether the login data is valid at 236, which may include contacting a third party system/server. If the login data is valid, method 220 may proceed to 238, where the third party account may be associated with the payment account. If the login data is invalid, method 220 may return to 232, to determine whether the user is still interested in connecting a third party account. If the consumer is not interested in associating a third party account with the payment account at 232, method 220 may end at 240. Returning to FIG. 12, the central system may be configured to provide access to the payment account, associated data, and/or functionality responsive to the consumer selecting go to application selection 1204.

Payments Via Consumer Device

FIG. 13 shows a flow chart of an example data flow represented by method 1300, which can result in facilitating a payment and/or other transaction, performed in accordance with some embodiments. Method 1300 may be performed by a consumer device (e.g., consumer device 3312 shown in FIG. 33), a merchant device (e.g., merchant device 3310) and a central system (e.g., one or more networked machines, promotional server 3320, payment server 3304 and/or promotional/payment server 3402). However, similar techniques may be applicable to payments between two peer devices (e.g., where a second consumer device acts like a merchant device as discussed herein).

In some embodiments, method 1300 may be performed after the consumer device has logged in or otherwise authenticated with the central system to access a payment account. Method 200 for creating the payment account may be performed with a consumer device that is different from the devices that are configured to send payments as referenced in connection with methods 100, 1300 and 1400 of FIGS. 1, 13 and 14, respectively.

At 1302, the central system may be configured to send wallet identifying data to the consumer device. As such, the consumer device may be configured to store the wallet identifying data. "Wallet identifying data," as discussed above, may refer to any type of data that may be used to secure data transfers between the consumer device and the merchant device while still enabling the consumer device to cause the merchant device to receive secure information about the consumer (and/or the consumer's payment account) from a payment processing system. For example, the wallet identifying may include, or may be based at least partially on, a random code generated by the central system that is associated with the payment account of the consumer. In some embodiments, each piece of wallet identifying data sent to the consumer device at 1302 may include a wallet identifying token and an associated private key.

In some embodiments, some or all of the messages sent by the consumer device to the merchant device may include and/or be signed with the wallet identifying data. The wallet identifying data and/or messages signed with wallet identifying data, if intercepted or otherwise downloaded by an unauthorized device, will not reveal consumer data, merchant data, financial information, and/or content of messages in some embodiments. Furthermore, messages that are signed with the wallet identifying data (e.g., the wallet identifying data, such as the private key, is appended or otherwise included with the message) may be used to identify the message sender and/or to authenticate the message sender (e.g., to prove that the sender is the identified correctly). In some embodiments, some or all of the messages sent by the merchant device to the consumer device may include and/or be signed with merchant identifying data. Merchant identifying data may include, or may be based at least partially on, a random code generated by the payment system that is associated with an account (e.g., a payment account, bank account, credit card account, savings account, etc.) of the merchant.

In some embodiments, the wallet identifying data may be used for sending consumer data, identifying the payment account associated with the consumer device, signing messages by the consumer device that demonstrate consumer consent (e.g., for a payment). proving the authenticity of the message, and/or encrypting messages to ensure that the messages remain secure. The wallet identifying data may in some example embodiments include one or more tokens generated by the central system. Furthermore, the wallet identifying data may be sent to the consumer device at virtually any time. For example, wallet identifying data may be sent to a consumer device when the consumer creates a payment account via the consumer device, logs in to the payment account via the consumer device, on a scheduled basis (e.g., each day, each hour, each month, etc.), in the course of a transaction, or the like.

At 1304-1308, the consumer device and the merchant device may be configured to form a connection. In some embodiments, the connection may be formed without the consumer device and/or the merchant device having active Internet access at the time of the connection (e.g., an active connection to the one or more public servers). For example, the connection may be a wireless connection over a personal area network (e.g., via PAN network 3322 shown in FIG. 33). Some suitable personal area network protocols may include Bluetooth, Infrared Data Association (irDA), wireless USB, ZigBee, WiFi, and Z-Wave. It is appreciated, however, that any other type of connection between the consumer device and merchant device, such as direct wire, Internet, near field communications and/or radio frequency identification technologies, may be used.

Figure 15:
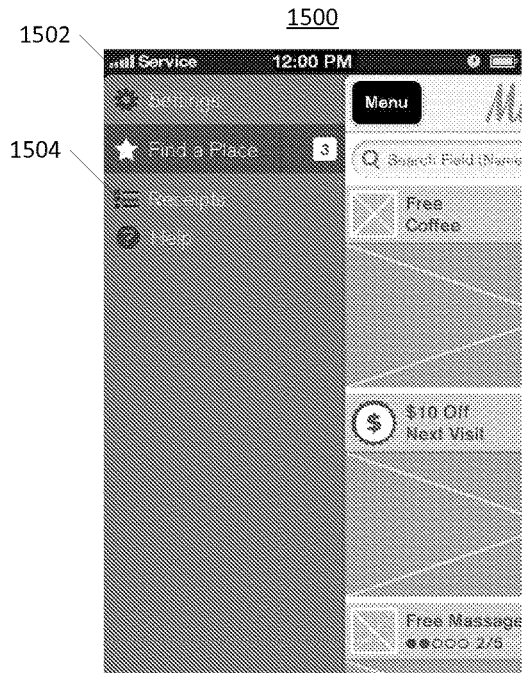

Depending on the protocol used, at 1304, the consumer device may begin announcing a payment service to other devices, such as the merchant device. For example, a process and/or application may execute on and configure the consumer device to broadcast (e.g., via Bluetooth) one or more suitable messages. FIG. 15 shows an example payment service menu display 1500 that may be displayed on the consumer device. The consumer may use settings selection 1502 to enable or disable the announcing of the payment service.

In some embodiments, the payment service may include one or more background processes that may run while the consumer device is locked, in a low-power mode, and/or executing other applications in the foreground. In some embodiments, the one or more broadcasted messages may include the wallet identifying data and/or be encrypted using the wallet identifying data.

At 1306, the merchant device may begin discovering the payment service. For example, a process and/or application may execute on the merchant device that configures the merchant device to discover other devices, such as the consumer device, that are currently announcing the payment service.

In some embodiments, the consumer device may be configured to discover the payment service while the merchant device may be configured to announce the payment service. Additionally and/or alternatively, both devices may be configured to be capable of announcing and discovering the payment service. For example, both devices may discover compatible devices and/or be discovered by compatible devices.

At 1308, a connection between the merchant device and the consumer device may be created. For example, the consumer device and merchant device may come within a certain discovery range (e.g., 10 meters for Bluetooth), such as when a consumer carrying the consumer device enters the merchant's shop. In some embodiments, the discovery range may be set by the merchant device and/or the consumer device and/or by the range at which the devices can be located from each other and still be able to communicate (such as when Bluetooth and/or other direct connect wireless technology is used).

At 1310, the consumer device may send the wallet identifying data to the merchant device. In some embodiments, the consumer device may send the consumer's name, URL for accessing the image data representing a picture of the consumer (e.g., as associated with the payment account at 210 of method 200), the image data itself, and/or other suitable consumer identification information. As discussed above, the wallet identifying data may include a wallet identifying token. For example, at least one of the wallet identifying tokens that the consumer devices received from the central system at 1302 may be sent to the merchant device at 1310.

In some embodiments, the wallet identifying data may include and/or provide a reference to consumer data stored in the one or more databases. As such, the wallet identifying data may be sent to the merchant device in place of actual consumer data that may be readily stolen by an unauthorized device. In some embodiments, the consumer device may send the consumer's name, the image data (or URL) and/or a payment account identifier (e.g., as used by payment system 3302) to the merchant device without including and/or using any wallet identifying data at 1310.

Figure 16:
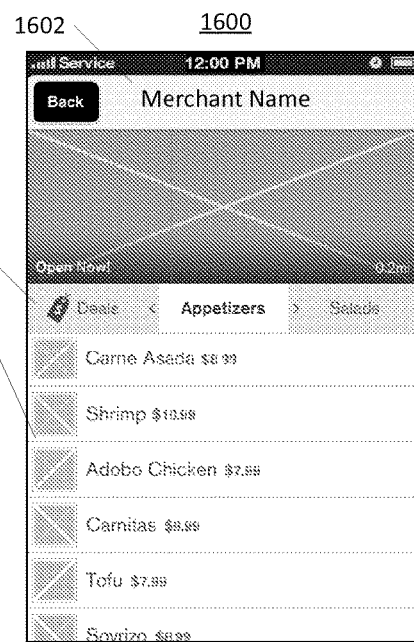

At 1312, the merchant device may send merchant data to the consumer device. For example, the merchant data may include merchant identifying data, or other data, that indicates the merchant's identity to the consumer device. The merchant data may further include information about the merchant, such as items for sale (e.g., products, services, etc.), promotional offerings, sales, etc. FIG. 16 shows an example merchant main display 1600, in accordance with some embodiments. Merchant main display 1600 may be shown on the consumer device at 1312 and may include the merchant data, such as merchant name at 1602, deals at 1604, and items at 1606.

Additionally and/or alternatively, the consumer device may access merchant main display 1600 and/or its data via the central system. For example, some or all of the merchant data may be stored in payment database 3302 and provided to consumer device 3312 via payment server 3306 and network 3308, as shown in FIG. 33. A consumer may search and/or browse a list for merchants (e.g., using search field 2608 of payment service main display 2600 shown in FIG. 26). Upon selecting a particular merchant, a merchant main display 1600 for the merchant may be shown on the consumer device.

In some embodiments, the merchant data sent from the merchant device at 1312 may include identification data but no additional merchant information. As such, the consumer device may be configured to request the additional information from the central system based on the identification data.

At 1314, the merchant device may be configured to establish a secure connection with the central system (e.g., via network 3308 shown in FIG. 33). For example, a merchant may provide login data to the central system that may be used to identify and authenticate the merchant. The discussion above regarding payment accounts for consumers may be applicable to merchant accounts. In that sense, displays may be provided to a merchant device for accessing, managing and/or creating a payment account configured to receive payments. The secure connection with the central system may be established at any suitable time, such as before the merchant device has connected with the consumer device at 1308. For example, the merchant device may include an Internet connection to the central system that is active in the course of merchant device operation.

At 1316, the merchant device may be configured to send the wallet identifying data received from the consumer device at 1310 to the central system. For example, the wallet identifying data may be sent via the secure connection established at 1314. As discussed above, the wallet identifying data may include data that identifies the consumer and/or the payment account associated with the consumer. In some embodiments, the wallet identifying data may be a wallet identifying token. Here, the associated private key is not sent with the wallet identifying token.

At 1318, the central system may be configured to validate the consumer, such as by using the wallet identifying data. For example, the central system may determine whether the wallet identifying data sent to the consumer device at 1302 matches or otherwise corresponds with the wallet identifying data received from the merchant device at 1316. In that sense, the central system may ensure that the wallet identifying data received from the merchant device at 1316 originated from the consumer device (e.g., at 1310) that is authorized to use the payment account. Additionally and/or alternatively, the central system may further be configured to extract some or all of the consumer information (e.g., the consumer's identity) from the wallet identifying data (e.g., by using a private key that correspond with a wallet identifying token).

At 1320, the central system may be configured to send consumer information and/or other types of consumer identifying data to the merchant device. In some embodiments, the consumer data may be stored in the one or more databases (e.g., payment database 3302 and/or 3404). The central system may be configured to request the consumer information based on the wallet identifying data received from the merchant device at 1316. The consumer information may include, for example, image data representing a picture of the consumer, payment account data, third party account data, purchase history data, user profile data, social network data, consumer preference data, etc.

In some embodiments, the consumer information may include data that may be used to facilitate consumer service. For example, the consumer information may indicate the consumer's purchase history and/or preferences such that a recommendation may be made to the consumer. For example, the merchant may use a consumer's preference for a particular drink to provide an offer or recommendation while the consumer is ordering. In another example, the consumer information may indicate that the consumer is a big spender or otherwise important. As such, the merchant may offer gifts (e.g., a low-value menu item) or other services.

FIG. 23 shows an example consumer information display 2300 that may be shown on the merchant device, in accordance with some embodiments. Consumer information display 2300 may be configured to notify the merchant that a compatible consumer device has been discovered and connected (e.g., at 1304-1308 of method 1300), to provide information about consumers for facilitating customer service, and/or to provide point-of-sale (POS) functionality. In some embodiments, a notification may also be shown on the merchant device at 1308 to indicate that a consumer has entered the vicinity of the merchant device (e.g., entered into communicable range) and/or merchant shop.

Consumer entry 2302 may include a display of consumer name at 2304, consumer image at 2306, recommended/favorite items at 2308, preference information at 2310, visit count at 2312, and/or promotional deals/rewards at 2314. Virtually any consumer information associated with the payment account may be shown in consumer information display 2300. In some embodiments, the consumer device may be configured to allow the consumer to set what consumer information is available to the merchant. Additionally and/or alternatively, the merchant device may be configured to allow the merchant to set the types of consumer information that is shown in consumer information display 2300.

In some embodiments, consumers may be listed in consumer information display 2300 based on the proximity of consumer devices to the merchant device. Consumers that are associated with consumer devices that are closer to the merchant device, for example, may be shown near the top of consumer information display 2300, or may otherwise be more readily accessible via consumer information display 2300, than consumers associated with consumer devices that are further from the merchant device. In that sense, consumer devices may further include location tracking and/or location sharing capability. For example, the merchant device can be configured to enable the merchant to show and/or hide various consumer information based on the proximity of the consumer device to the merchant device (using, e.g., real time locating system functionality, received signal strength indication, travel-time locating, and/or any other suitable proximity determining functionality).

At 1322, the merchant device may be configured to receive product identifying data for one or more items (e.g., products, services, etc.). The product identifying data may further include price data for the one or more items. For example, the merchant may select a consumer from consumer information display 2300, which may allow the merchant to associate the one or more items with the consumer to generate a shopping list. As will be discussed below in greater detail, the merchant device may be a point-of-sale (POS) device that is configured to receive the product identifying data. As such, the items may be entered to the merchant device in any suitable way including via barcode scan, radio-frequency identification (RFID), merchant input via a selectable menu, etc.

At 1324, the merchant device may be configured to send a total cost for the one or more items to the consumer device. As such, the merchant device may be further configured to generate a total cost for the one or more items. For example, the merchant device may be configured to generate a sum based on the price data for each item. The merchant device may also add costs (e.g., service costs, tips, taxes, warranties, or the like) and/or deduct costs (e.g., deal vouchers, rewards, discounts, sales, store credits, promotions, etc.) from the sum to generate the total cost. In some embodiments, the merchant device may be configured to receive promotional offer data (or deal data) associated with a discount. For example, the deal data may be received from the consumer device, the payment server, and/or a promotional server (e.g., promotional server 3320 and/or promotional/payment server 3402). As such, the merchant device may be configured to apply the discount to the total cost based on the deal data. The total cost, as well as the product identifying data, may then be sent to the consumer device for payment approval at 1324. In some embodiments, the total cost may be part of transaction data that also includes a transaction ID (a unique number or code generated by the merchant device for each transaction) and/or a merchant ID (a unique number or code associated with each merchant or peer), In some embodiments, the merchant device may be configured to allow the merchant to select from a plurality of payment types. For example, the merchant may ask the consumer how the consumer would like to pay. The consumer may decide, for example, to pay by cash, credit card, or otherwise without using the consumer device. As such, the merchant device may be configured to accept alternative forms of payment. If the consumer decides to pay via the consumer device, the merchant may so indicate by selecting a selection on the merchant device, which may cause the merchant device to send the total cost to the consumer device at 1324.

Additionally and/or alternatively, the one or more items may be entered by the consumer device. For example, a consumer may browse the merchant's shop and scan items (e.g., via an image capturing device, barcode scanner, etc.) using the consumer device to build the shopping list. In some embodiments, the consumer device may be configured to allow the consumer to create the shopping list via the Internet (e.g., online shopping via merchant main display 1600), at the merchant via the consumer device, and/or at locations remote from the merchant. The consumer device may then send the one or more items in the shopping to the merchant device and receive the total cost in response. Alternatively and/or additionally, the consumer device may be configured to calculate the total cost.

In some embodiments, the consumer device may be configured to include a location tracking device and/or otherwise send its location to the merchant device and/or the central system (e.g., payment server 3306, a promotional server, etc.) while the consumer is in the merchant's shop. Advertisements, sales, promotional offers, or the like may be sent to the consumer device based on its location. For example, when the consumer device is browsing in a section for refrigerators, one or more offers related to refrigerators may be provided to the consumer device. In addition to offers, the consumer device may be configured to request assistance and/or information regarding potential purchases.

Figure 17:
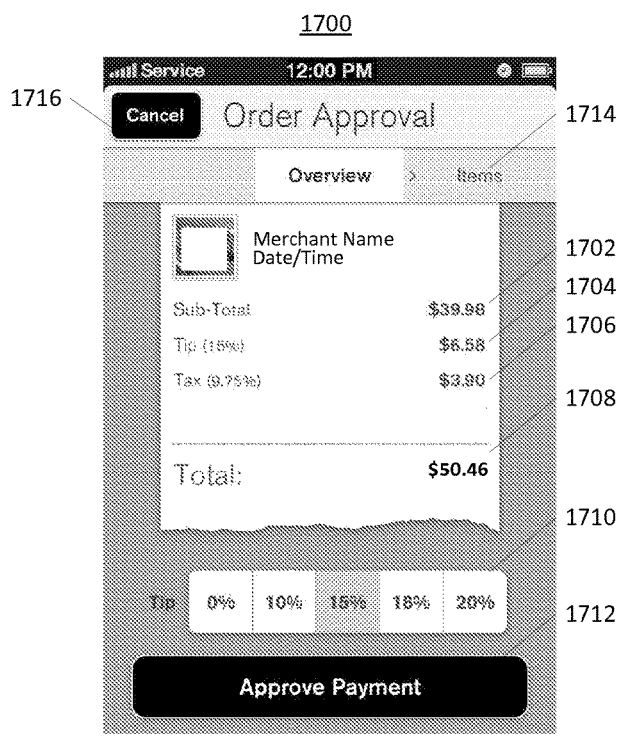

At 1326, the consumer device may be configured to determine whether to approve payment. In some embodiments, approving the payment may include generating an indication of approval. FIG. 17 shows an example order approval display 1700 that may be shown on the consumer device. Order approval display 1700 may include sub-total display 1702, tip display 1704, tax display 1706 and total amount display 1708. Furthermore, the consumer may select shopping list selection 1714 to view a listing of items (e.g., the one or more items whose price data provides a basis for the sub-total).

In some embodiments, the consumer device may be configured to allow the consumer to select a tip amount. For example, the consumer may select a tip percentage using tip selection 1710. Responsive to a tip selection, tip display 1706 and total amount display 1708 may be updated to reflect the new tip and total amounts. In some embodiments, the consumer device may allow the consumer to enter a tip amount. As such, a consumer may tip a merchant for service regardless of whether the consumer makes a purchase. For example, a consumer may browse goods at a store and make the purchase online. If the consumer received assistance from a merchant, the consumer may send a tip amount via the consumer device for the service. Furthermore, if the consumer has associated a plurality of payment sources with the payment account, the consumer device may further be configured to allow the consumer to select a particular payment source.

If the consumer is satisfied with the payment, the consumer may select approve payment selection 1712. In some embodiments, selecting approval payment selection 1712 may indicate approval of the payment. Additionally and/or alternatively, the consumer device may allow the user to provide an additional indication of consent. For example, the consumer may be prompted to select a box (e.g., a checkbox that indicates consent), provide login data, generate a signature (e.g., via a touch sensitive device such as a touch sensor), enter a pin number, and/or provide a biometric identifier (e.g., a fingerprint, voice message, retina scan, behavioral identifier, etc.). If the consumer is not satisfied with the total amount or otherwise does not approve of the payment, the consumer may select cancel order selection 1716.

Returning to FIG. 13, the consumer device may be configured to send consumer approval data secured with wallet identifying to the merchant device at 1328. The consumer approval data may provide an indication as to whether the consumer has approved the payment. As discussed above, some or all of the messages sent from the consumer device may include and/or be signed with the wallet identifying data (e.g., to create an electronic or digital signature). For example, the consumer approval data may be sent to the merchant device with the wallet identifying data (e.g., as a signature) and/or be encrypted using the wallet identifying data.

In some embodiments, the consumer approval data may include one or more messages that may include consumer data (e.g., consumer name, payment source information, payment account identification, etc.), transaction data (e.g., total amount, time of transaction, location, etc.), and/or the additional indication of consent. For example, a message may be formatted with JavaScript Object Notation (JSON), where each piece of data is associated with a field. In one embodiment, the consumer approval data may consist of an electronic signature created by appending a private key to a data string representing the transaction data and then performing an algorithmic transformation, such as a one way hash of the private key appended data string (e.g., using a cryptographic hash functions such as SHA-1).

In some embodiments, a message (hashed, signed, or otherwise) may be encrypted using the wallet identifying data. The encrypted message may also be stored in the message (e.g., in a field within the JSON format) itself. Additionally and/or alternatively, the message may be signed using the wallet identifying data (e.g., a private key may be is included in the message, such as in a field within the JSON format) and then encrypted. As such, the consumer approval data may further include the wallet identifying data that the consumer device received from the payment server at 1302.

In some embodiments, the wallet identifying data used at 1328 may include a different wallet identifying token and/or private key than those used at 1310 and, in some embodiments, the wallet identifying data used at 1328 may include the same wallet identifying token and/or private key used at 1310. In other embodiments, the payment system may send wallet identifying data that includes a wallet identifying token and an associated private key to the consumer device at 1302. As such, the wallet identifying token may be used at 1310 and the private key may be used at 1328. In some embodiments, each wallet identifying token and/or private key may only be used one time (or for only a limited time), thus the payment system may be able to identify potential security problems when a single wallet identifying token and/or private key is used in two different messages and/or payments.

In some embodiments, the consumer device may be configured automatically approve the payment based on satisfaction of one or more trigger conditions. In that sense, the consumer may not need to approve an order via order approval display 1700. For example, the consumer device may be configured allow the consumer to generate the shopping list (e.g., by scanning items with the consumer device and/or via the merchant) and simply walk out of the store. The location of the consumer device may be tracked such that the approval/disapproval data and/or wallet identifying data are sent to the merchant device at 1328 when the consumer leaves the merchant, is a certain distance from a merchant device, etc. In some embodiments, the consumer may be allowed to set automatic approvals ON or OFF. Additionally and/or alternatively, a consumer may specify that only certain types of transactions require approval. For example, the consumer may add/remove approved merchants from a list, where the approved merchants do not require the approval. In another example, approval for an initial purchase may be required at each merchant, but not for subsequent purchases. Similarly, an approved merchant may be removed or otherwise set such that the next and/or every transaction with the merchant needs to be approved. In some embodiments, the merchant may be able to require consumer approval either at all times or based on various conditions. For example, the merchant may set a value that requires consumer approval for payments above the set value.

At 1330, the merchant device may be configured to send the consumer approval data secured with the wallet identifying data to the central system. In some embodiments, the consumer approval data sent by the consumer device at 1328 may be sent to the central system without any substantial processing and/or decoding by the merchant device. As such, the central system may be configured to provide a payment service to the merchant device to facilitate financial transactions (e.g., process payments from the consumer's payment account to a merchant's payment account and/or other financial account). In some embodiments, only approved payments are sent to the central system. In some embodiments, the merchant may be able to require consumer approval either at all times or based on various conditions. For example, the merchant may set a value that requires consumer approval for payments above the set value.

In some embodiments, the merchant device may be configured to generate secure payment approval data based on the consumer approval data and send the secure payment approval data to the merchant device. The secure payment approval data may include the consumer approval data and the transaction data (e.g., as may be modified by the consumer at 1418, such as to add a tip amount to the total cost).

At 1332, the central system may be configured to validate and/or process the payment. For example, the central system may process the wallet identifying data to decode and/or otherwise authenticate the consumer data, transaction data, and/or the indication of consent sent from the merchant device. Furthermore, the central system may determine the payment account, payment source, total amount, or the like based on the received and/or extracted transaction data.

In some embodiments, where the consumer approval data consists of an electronic signature created by appending a private key to a data string representing the transaction data and then performing an algorithmic transformation, such as a one way hash of the private key appended data string, the payment system may be configured to validate the payment by recreating the electronic signature based on the transaction data. For example, the transaction data and the consumer approval data may be received from the merchant device. Next, the central system may append the private key (e.g., as stored in the payment system) to the transaction data and perform the same algorithmic transformation to recreate the consumer approval data. If the recreated consumer approval data matches the received consumer approval data, the payment may be validated.

In some embodiments, processing the payment may further include communicating with one or more third party servers, such as credit card servers, bank account servers, and/or any other type of financial server that may be suitable to help complete the financial transaction. For example, the payment server may send some or all of the transaction data to the one or more third party servers and receive an indication as to whether the financial transaction was successful.

In some embodiments, a promotional offer (e.g., a discount) may be applied to the payment, as discussed in greater detail below with respect to methods 2900 and 3100. As such, the payment server may be further configured to charge the total cost less the discount to the payment account. Furthermore, the merchant account may be reimbursed for the total cost less the discount. In some embodiments, the payment server may be configured to charge a payment processing fee as a service charge. As such, the merchant account may be reimbursed for the total cost less the discount less the payment processing fee.

At 1334, the central system may be configured to send a receipt for the payment to the consumer device. The receipt may alternatively, and/or additionally, be sent to merchant device and then sent from the merchant device to the consumer device (e.g., when the consumer device does not include an active connection to the payment server and/or when the payment server is otherwise unable to communicate with the consumer device).

Figure 18:
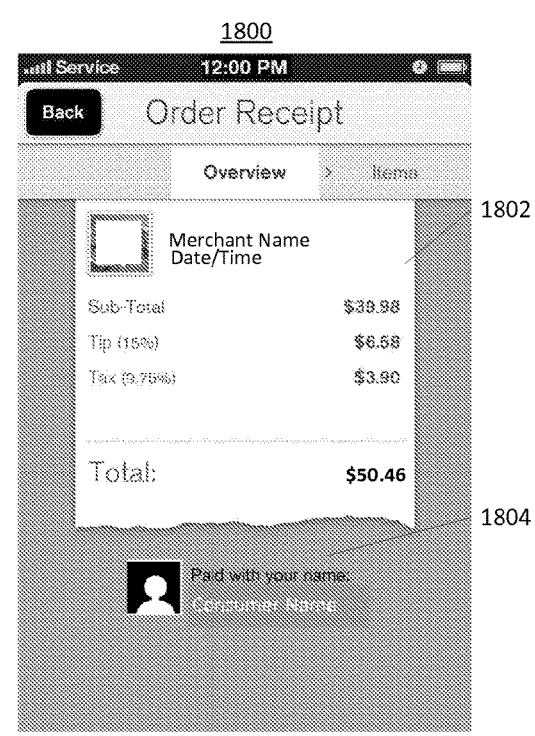
Figure 19:
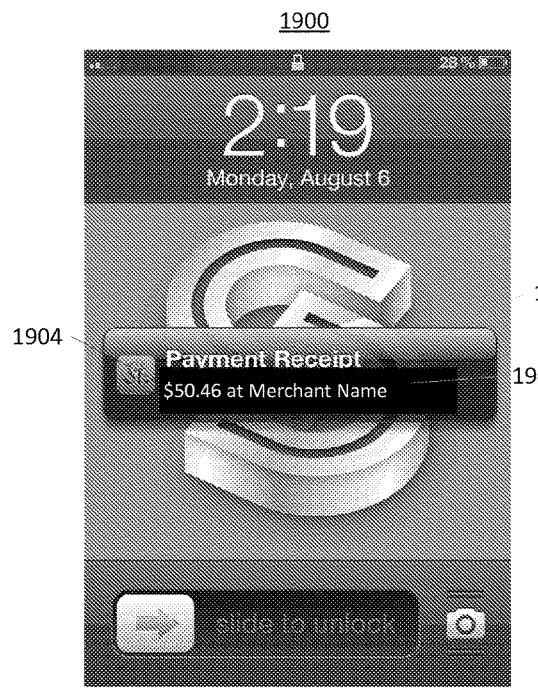

FIG. 18 shows an example receipt display 1800, in accordance with some embodiments. Receipt display 1800 may be shown on the consumer device to provide an indication to the consumer that the financial transaction was successfully. As such, receipt display 1800 may include transaction data at 1802 and payment confirmation display 1804. FIG. 19 shows a receipt notification display 1900 that may be shown additionally and/or alternatively shown on the consumer device. For example, receipt notification display 1900 may be shown responsive to the consumer device receiving the receipt. Receipt notification display 1900 may include notification selection 1902 that includes transaction price indicator 1904 and merchant indicator 1906. In some embodiments, displays providing receipt information (e.g., display 1800 and/or 2000-2200) may be shown on the consumer device responsive to the consumer selecting notification selection 1902 to provide more information about the receipt.

Figure 20:
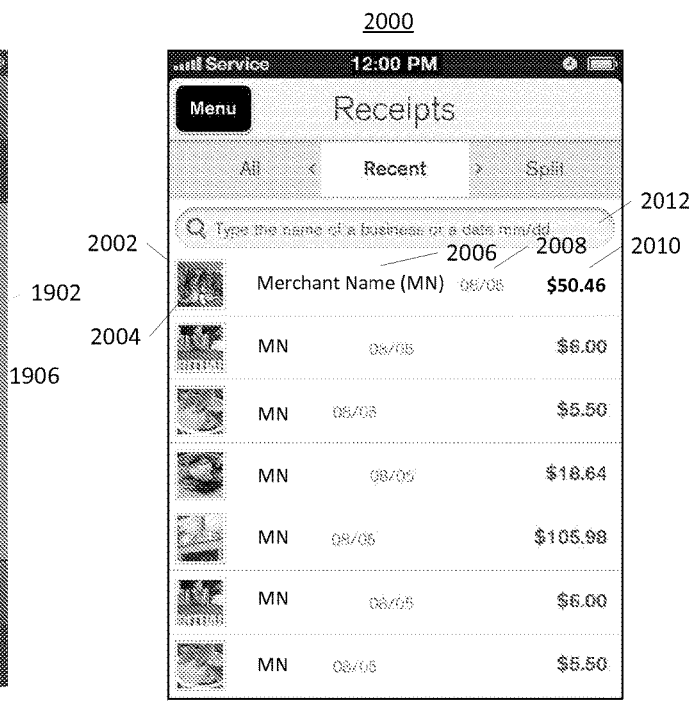

FIG. 20 shows an example receipt listing display 2000, in accordance with some embodiments. Receipt listing display 2000 may be configured to provide a listing of receipts associated with the payment account. Receipt listing display 2000 may be accessed, for example, by selecting receipts selection 1504 in payment service menu display 1500. As shown, a listed receipt (e.g., listed receipt 2002) may include a display of merchant image 2004 (e.g., a trademark, symbol, slogan, icon, graphic, photograph, etc.), merchant name 2006, transaction date 2008 and/or amount paid 2010. The receipts may be listed based on virtually any ordering criteria, such as the transaction date or merchant name, in some example embodiments.

In some embodiments, receipts may be searchable. For example, a consumer may enter search criteria (e.g., merchant name or transaction date as shown in FIG. 2000)) in receipt search 2012. Responsive to entering the search, the consumer device may show a listing of receipts that fit, or come closest to fitting, the search criteria.

Figure 21:
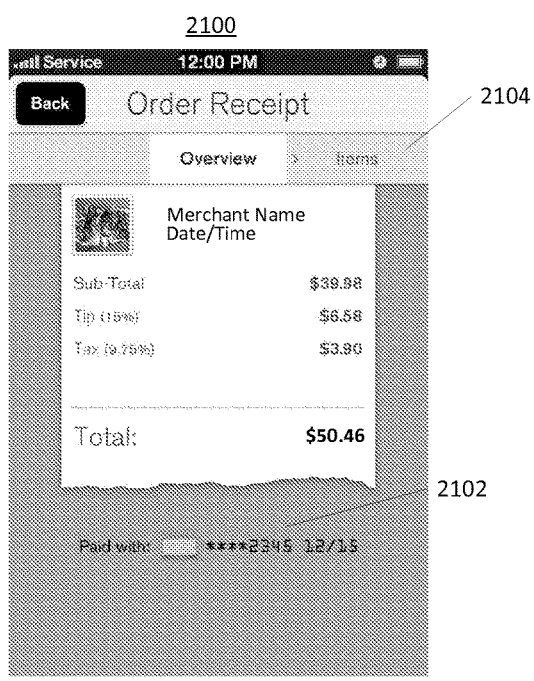

In some embodiments, the listed receipts in receipt listing display 2000 may be selectable. Upon selecting a listed receipt, additional information about the receipt may be shown on the consumer device. For example, upon selecting listed receipt 2002, the consumer device may be configured to show receipt display 2100. The discussion above regarding receipt display 1800 may be applicable to receipt display 2100. In some embodiments, receipt display 2002 may alternatively and/or additionally include payment source identifier 1806. As shown in FIG. 21, payment source identifier 2102 indicates that the payment was made with a credit card ending having a credit card number ending with 2345 and a 12/15 expiration date.

Figure 22:
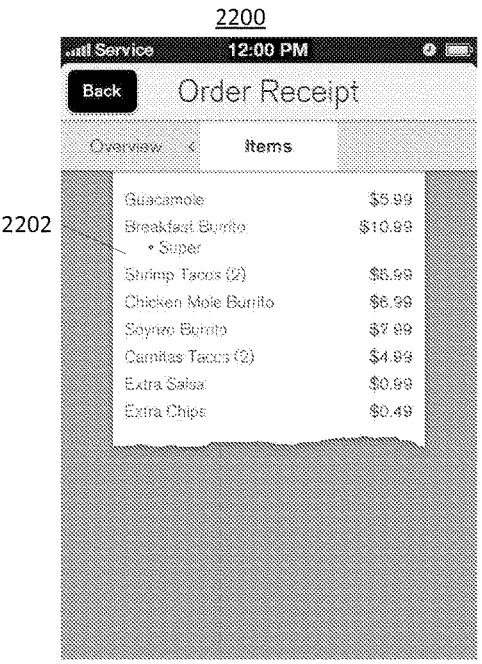

In some embodiments, the consumer device may be configured to allow the consumer to view items associated with the receipt. For example, the consumer may select receipt item selection 2104 in receipt display 2100. FIG. 22 shows an example view receipt items display 2200 that includes receipt items listing 2202. As shown, receipt items listing 2202 may include a list of items and associated price data.

Returning to FIG. 13, the central system may be configured to send a confirmation to the merchant device at 1336. For example, the confirmation may indicate whether the payment was successfully processed. An indication may be shown on the merchant device to alert the merchant. For example, if the payment was not successful, the merchant may request that the consumer provide an alternate form of payment and/or to resubmit the payment via the consumer device.

As discussed above, the techniques disclosed herein may apply not only to payments between consumer devices and merchant devices, but to any type of suitable devices or "peer devices." For example, a merchant may use a first device to pay a second merchant using a second device. In another example, a consumer may use a first device to pay a second consumer using a second device. In that sense, method 1300 may allow two users of any kind to access to their payment accounts, discover compatible devices, and/or make payments with each other for any purpose.

FIG. 14 shows a flow chart of an example of a method 1400 of making a payment, performed in accordance with some embodiments. Some of the discussion above regarding method 1300 may be applicable to method 1400 and are not repeated in detail to avoid unnecessarily complicating the disclosure. Method 1400 may allow a first peer device to provide a payment to a second peer device. Thus the discussion regarding the first peer device may be applicable to the second peer device, and vice versa. Method 1400 may be used among merchants and/or other peer devices, and/or simply when the payee does not have network access to the payment system at the time the transaction occurs with the payor.

At 1402, the central system (e.g., payment server 3304, promotional server 3320, and/or promotional/payment server 3402) may be configured to send wallet identifying data to a first peer device (e.g., a consumer device or a merchant device). The wallet identifying data may be configured to secure messages sent from the first peer device.

At 1404-1408, the first peer device and the second peer device may be configured to form a connection. As discussed above regarding method 1300 at 1304-1308, the connection may be formed without the first peer device and/or the second peer device having active Internet access at the time of the connection (e.g., an active connection to the one or more servers). Instead, a personal area network that allows for device discovery, or similar techniques, may be used.

At 1410, the first peer device may be configured to send the wallet identifying data to the second peer device. If the second peer device has an active connection to the central system, the wallet identifying data may be sent to the central system and consumer data may be returned to the second peer device from the central system after validation, as discussed above.

Additionally and/or alternatively, if the second peer device does not include the active connection to the central system, the second peer device may be configured to store the wallet identifying data at 1412. In some embodiments, the first peer device may be further configured to send some or all of the consumer information at 1412 (e.g., as discussed at 1320 of method 1300) to the second peer device. In that sense, some or all of the consumer information may be signed or otherwise secured with the wallet identifying data. For example, private information such as payment account data may be secured while basic information (e.g., name, image data) may be sent without the wallet identifying data. Consumer information that is not secured may be readily accessible by the second peer device without sending the wallet identifying data to the central system for secure retrieval (e.g., as discussed at 1316 of method 1300).

At 1414, the second peer device may be configured to receive product identifying data for one or more items. The discussion above regarding 1322 of method 1300 may be applicable at 1414. For example, the items may be entered into the second peer device and/or be entered into the first peer device and then sent to the second peer device. If the items are entered by the second peer device, the second peer device may be further configured to generate a total cost (e.g., based on price data) and to send the total cost to the first peer device at 1416. In another example, the first peer device and/or the second peer device may be allowed to simply enter the total cost and/or select items from a virtual listing.

At 1418, the first peer device may be configured to determine whether to approve the payment. At 1420, the first peer device may be configured to send consumer approval data secured with the wallet identifying data to the second peer device. The discussion above regarding 1326-1328 of method 1300 may be applicable at 1418-1420.

In some embodiments, at least some of the consumer approval data may be sent by the first peer device such that the second peer device may determine whether the payment was approved without communicating with the central system. For example, a message or a part of a message may include an unsecured indication regarding whether the payment is approved or disapproved that may be understood by the second device. Other data (e.g., consumer data, transaction data, and/or the additional indication of consent) may be signed or otherwise secured with the wallet identifying data such that the content is accessible only via the central system.

At 1422, the consumer approval data secured with the wallet identifying data may be stored by the second peer device (or a separate storage device that may be accessed by the second peer device). For example, if the second peer device does not include an active connection to the central system, the second peer device may be configured to store the data until a connection with the central system is established. Alternatively and/or additionally, if the second peer device does include an active connection, the second peer device may be configured to send the consumer approval data (or secured payment approval data, as discussed above) to the central system at 1422.

At 1424, the second peer device may establish a secure connection with the central system (e.g., if the secure connection is not already active). At 1426, the second peer device may send the consumer approval data (or secured payment approval data, as discussed above) secured with the wallet identifying data to the central system. At 1428, the central system may be configured to validate and process the payment. At 1430, the central system may send a receipt to the first peer device (either directly, or via the second peer device). At 1432, the central system may be configured to send a payment confirmation to the second peer device. The discussion above at 1314 and 1330-1336 of method 1300 may be applicable at 1424-1432.

Presence Based Deal Offers

FIG. 24 shows a flow chart of an example of a method 2400 for providing a promotional offer to the consumer, performed in accordance with some embodiments. Method 2400 may be performed by a central system (e.g., payment server 3304, promotional server 322, and/or promotional/payment server 3402). Alternatively and/or additionally, method 2400 may be performed by the merchant device. A promotional offer, as used herein, may refer to deals, sales, discounts, giveaways, deal vouchers, rewards, or any other offering that may be presented to the consumer. In that sense, the promotional offer may be used to entice a consumer to visit a merchant, to introduce or otherwise advertise products or services, to reward consumer loyalty, or the like.

In some embodiments, a payment account may be associated with a promotional account. For example, the promotional account may be managed by promotional system 3316 that is separate from payment system 3302 that manages the payment account. The promotional account may be further associated with promotional offer data stored in one or more databases (e.g., promotional database 3318) that may be used to generate the promotional offer. In that sense, the payment account may be associated with the promotional offer data via the promotional account. Alternatively and/or additionally, the promotional offer data may be associated directly with the payment account (e.g., via promotional/payment server 3402).

Method 2400 may begin at 2402 and proceed to 2404, where purchase history associated with a payment account may be received. In some embodiments, the purchase history may include purchases at one or more merchants. For example, previous purchases that were made via the payment account may be tracked to provide an indication as to the consumer's preferences, interests, future purchases, or the like.

At 2406, one or more available deal vouchers may be received. Available deal vouchers, as used herein, may refer to agreements that may be purchased or otherwise accepted by the consumer. The deal voucher may specify, for example, that the consumer will receive a product or service in exchange for the redeeming the deal voucher. In that sense, available deal vouchers may be offered at less than the regular price of the product or service to entice the consumer into purchasing the one or more available deal vouchers.

In some embodiments, one or more available item-level deals may also be received. Item-level deals, as used herein, refers to deal vouchers related to a particular item. For example, an item-level deal may specify that a $50 item may be exchanged for an item-level deal voucher that costs $25. In some embodiments, sales and/or inventory data may be used as a basis for generating the one or more available item-level deals. Some embodiments may further provide for the self-service deal creation. For example, the consumer may be allowed to propose deal vouchers and/or select from various terms that may be incorporated into a deal voucher. In some embodiments, the one or more available deal vouchers may be in the form of gift cards. For example, the consumer may be allowed to purchase a deal voucher that provides for a gift to a second consumer.

At 2408, one or more unused deal vouchers that have been purchased by the consumer (e.g., associated with the payment account and/or promotional account) may be received. For example, the consumer may have previously purchased a deal voucher with the payment account but has not yet redeemed the purchased deal voucher. In some embodiments, deal vouchers that may be used at merchants, that have not expired, and/or that have not been redeemed may be retrieved at 2408.

At 2410, third party account data and/or payment account profile data may be received. As discussed above with respect to methods 100 and 200, the third party account may be a social networking account provided by one or more third party servers (e.g., third party system 3214 shown in FIG. 32). A "social network," as used herein, may refer to an online service, platform, or internet site that is configured to facilitate the building of social connections for its account holders. A user may create a profile and share preference information such as interests, hobbies, likes, dislikes, etc. via the internet. Furthermore, the user may create an association with other users, such as by sending "friend requests," responding to friend requests, and/or joining user groups. In some embodiments, the payment account may be a social networking account, may include social networking capabilities, and/or may otherwise include profile data. Furthermore, preferences of friends and/or family of the consumer, as well as their order histories, may also be retrieved at 2410.

At 2412, reward tracking data associated with the payment account may be received. A reward, as used herein, may refer to a product or service that may be awarded to the consumer for loyalty to a merchant. For example, the consumer may receive a free item from a restaurant after ten visits to the restaurants. As such, purchases using the payment account may be tracked. The reward tracking data may include information regarding available rewards and/or information regarding reward status of the payment account (e.g., the consumer has made five out of ten purchases required for the reward).

Figure 25:
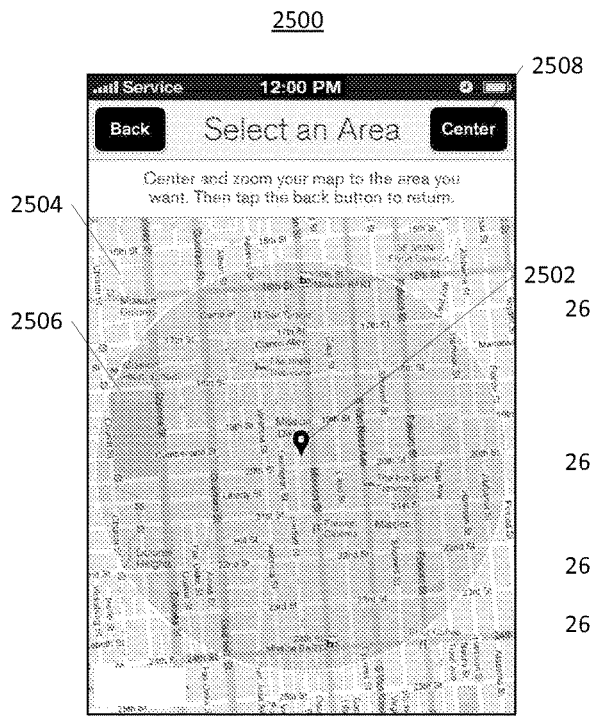
Figure 26:

At 2414, a selected location may be received from the consumer device. The selected location may be used, among other things, to select and/or prioritize promotional offers associated with one or more merchants near the selected location. FIG. 25 shows an example map display 2500 that may be shown in the consumer device, in accordance with some embodiments. The consumer may access map display 2500 upon selecting map selection 2612 in payment service main display 2600, shown in FIG. 26. Map display 2500 may be configured to allow the consumer to select a location, as shown by location indicator 2502, via a graphical map 2504. The consumer may also specify an area (e.g., area 2506) around the location to indicate interest in merchants and/or promotional offers associated with merchants within the selected area. Center selection 2508 may be configured to center graphical map 2404 at location indicator 2402 and/or to place location indicator 2404 at the location of the consumer device.

At 2416, the location of the consumer device may be received. In some embodiments, the location of the consumer device may be tracked (e.g., via global positioning systems (GPS), cell tower triangulation, WiFi hotspots, or the like) and received by the central system via network 3208. As such, the central system may be configured to provide promotional offerings associated with merchants that are near the consumer device while the consumer device is at any location. The consumer device may also be configured to send its location to the central system.

As discussed above, promotional offers may be sent to the consumer device while the consumer is at a particular merchant (e.g., while the consumer device has established a PAN connection with the merchant device, as discussed above with respect to methods 1300 and 1400). As such, the consumer device may be provided with promotional offers while the consumer shops. For example, if the consumer device is determined to be at the furniture section of a department store, promotional offers that are relevant to furniture may be sent to the consumer device. In some embodiments, the consumer device may be tracked within the merchant shop using received signal strength indication (RSSI) and/or triangulation via the PAN connection to the merchant device. Additionally and/or alternatively, beacons, one or more other merchant devices, and/or other devices may be used to complement and/or replace the RSSI. As such, the merchant device may be configured to send the promotional offer in response to determining a distance between the consumer device and the merchant device is less than a predetermined threshold. By using the PAN connection, or the like, the location of the consumer device may be determined even if the consumer device does not have an active Internet connection (e.g., for GPS tracking, cell tower triangulation, WiFi hotspots, or the like). In that sense, some embodiments may include a merchant device (and/or other device at the merchant shop) configured to determine the location of the consumer device and/or to send the location to the one or more servers at 2416.

At 2418, one or more promotional offers may be generated based on the received data (e.g., the data received at 2404-2416). At 2420, the one or more promotional offers may be sent to the consumer device. As discussed above, the one or more promotional offers may be associated with a plurality of merchants, such as when the consumer device has not connected with a particular merchant at the merchant shop or otherwise requested promotional offers from a particular merchant. Returning to FIG. 26, payment service main display 2600 shows example promotional offers 2602-2606 for a plurality of merchants (e.g., merchants 1-3). Payment service main display 2600 may be accessed after the consumer has provided login data and received access to the payment account, as discussed above at 104-110 of method 100).

Promotional offer 2602 is an available deal voucher that when purchased can save the consumer $10 towards a future purchase with merchant 1. For example, the deal voucher may be worth $30 when used at merchant 1. The consumer may select promotional offer 2606 to purchase the deal voucher for $20, giving the consumer a $10 discount deal voucher. Promotional offer 2606 is an unused deal voucher worth $20 that may be redeemed with merchant 2. In the third example, promotional offer 2608 is a reward for a free pair of socks. As shown at 2610, the consumer may be eligible for the reward after completing five purchases at merchant 3. Furthermore, the consumer has already completed four of the five purchases as indicated at 2610.

Figure 27:

Additionally and/or alternatively, the one or more promotional offers may be specific to a particular merchant. FIG. 27 shows an example merchant promotional offering display 2700 that includes promotional offers 2702, in accordance with some embodiments. As discussed above at 1312 of method 1300, the one or more promotional offers may be sent to the consumer device when the consumer is at the merchant shop as the merchant data (e.g., via the PAN connection with the merchant device). Additionally and/or alternatively, the consumer device may access merchant main display 1600 and/or its data via the central system at any location with Internet access.

Figure 28:
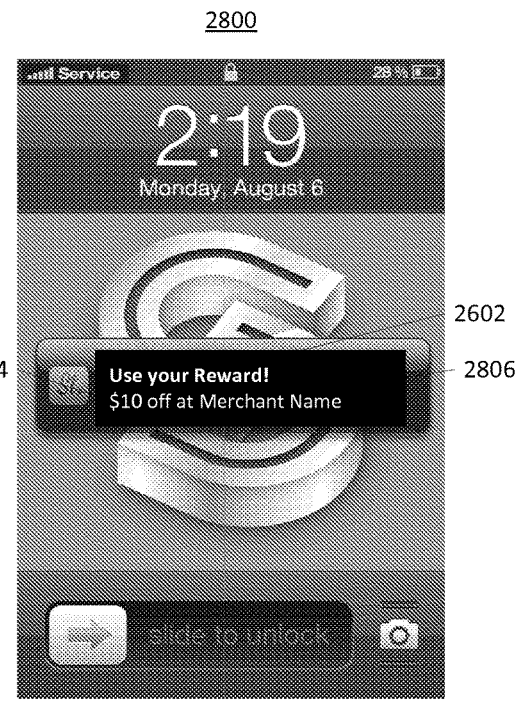

In some embodiments, the merchant device may be configured to push the one or more promotional offers to consumer device via the PAN connection. As such, promotional offers may be presented to the consumer device when the payment service is running in the background of the consumer device (e.g., at 1312 of method 1300 and/or while the consumer is shopping at the merchant). FIG. 28 shows an example of an offer display 2800 that may be shown in the consumer device, in accordance with some embodiments. Offer display 2800 may include promotional offer selection 2802 that includes a promotional offer type indicator 2802 (e.g., a reward as shown in FIG. 28), offer value indicator 2804 and merchant indicator 2406. While a reward offer is shown, it is appreciated that the merchant device may be configured to send any type of promotional offer to the consumer device at 2420. In some embodiments, upon selecting promotional offer selection 2802, the consumer device may be configured to allow the consumer to purchase, redeem, or otherwise accept the promotional offer. In some embodiments, promotional offers may be associated with the payment account after the consumer has purchased, accepted, or is otherwise eligible for the promotional offer. Method 2400 may end at 2422.

FIG. 29 shows a flow chart of an example of a method 2900 for applying a deal voucher to a payment, performed in accordance with some embodiments. For example, when the consumer device is used to make a payment (e.g., as discussed with respect to methods 1300 and 1400), one or more applicable deal vouchers may be applied automatically. In some embodiments, a central system (e.g., payment server 3304, promotional server 3320 and/or promotional/payment server 3402) may be configured to perform method 2900. Alternatively and/or additionally, a merchant device (e.g., merchant device 3210) may be configured to perform method 2900. As such, method 2900 may be performed between 1322 of method 1300, where product identifying data for one or more items may be received by the merchant device, and 1324 of method 1300, where the total cost of the one or more items may be sent to the consumer device. To avoid unnecessarily complicating the disclosure, method 2900 will be mostly described as being performed by the central system, but some or all of the steps may be performed by the merchant device.

Method 2900 may begin at 2902 and proceed to 2904. At 2904, the central system may be configured to access one or more deal vouchers associated with the payment account. As discussed above with respect to methods 1300 and 1400, the central system may be configured to identify the payment account based on received wallet identifying data and/or the consumer providing login data. In that sense, the one or more deal vouchers (as well as other promotional offer data) may be associated with the wallet identifying data.

The one or more deal vouchers may include one or more unused deal vouchers stored in one or more databases (e.g., promotional database 3318 and/or promotional database 3406) with an association to the payment account. In some embodiments, the central system may be further configured to access the one or more databases via one or more promotional servers (e.g., promotional server 3320 and/or promotional/payment server 3402).

If the merchant device is configured to perform method 2900, at 2904, the merchant device may be configured to receive the one or more deal vouchers associated with the payment account with the consumer data received from the central system (e.g., at 1320 of method 1300, such as in response to sending the wallet identifying data to the central system at 1316).

At 2906, the central system may be configured to receive product identifying data for one or more items. As discussed above, the product identifying data may identify the one or more items selected by the consumer for purchase. The product identifying data may also include price data for the one or more items. Furthermore, a total cost may be included with the product identifying data and/or may be determined based on the product identifying data.

In some embodiments, the merchant device may send the product identifying data received at 1332 of method 1300 to the central system. If the merchant device is configured to perform method 2900, the discussion above at 1322 may be applicable to 2906. For example, the merchant device may receive the product identifying data via scanned barcodes for one or more selected items, merchant entry, from the consumer device via the PAN, etc.

At 2908, the central system may be configured to determine whether a deal voucher associated with the payment account is applicable to the payment. In some embodiments, the determination may include comparing the product identifying data with the deal vouchers. For example, if a deal voucher provides for a $10 discount on all electronics purchases, the determination may include identifying whether any of the one or more items include electronic purchases. In another example, a deal voucher may provide for a $15 discount for purchases of $100 or higher. Here, the determination may include determining whether the total cost exceeds $100.

If a deal voucher is determined to be applicable at 2908, method 2900 may proceed to 2910, where a deal voucher amount of the deal voucher may be deducted from the total cost. Returning to the example above, if the total cost of the one or more items is $150 and the $15 dollar discount is applied, an updated total cost may be determined to be $135.

At 2912, the applied deal voucher may be removed from, or otherwise unassociated with, the payment account. For example, an indication that the deal voucher has been used may be stored in the central system (e.g., in one or more databases) such that the same deal voucher is not applied for subsequent transactions. In some embodiments, the merchant device and/or the central system may be further configured to generate redemption data indicating the discount has been applied and/or that the deal data has been redeemed. In some embodiments, the merchant device and/or the central system may be further configured to transmit the redemption data to a promotional server for removal from the payment account.

At 2914, the central system may be configured to updated total cost may be sent to the consumer device. For example, the central system may send the updated total cost to the merchant device, which may then send the updated total cost may be sent to consumer device (e.g., at 1324 of method 1300). The updated total cost may also be generated and sent to the consumer device by the merchant device (e.g., at 1324 of method 1300) in embodiments where method 2900 is performed by the merchant device. In some embodiments, the central system may be configured to send deal voucher data (e.g., the deal voucher amount) to the merchant device. The merchant device may be configured to update the total cost and then send an indication to the central system to remove the deal voucher from the payment account.

In some embodiments, method 2900 may be performed such that the consumer does not need to present or otherwise request the application of applicable deal vouchers when making the payment with the consumer device. As such, some embodiments may provide for seamless integration of promotional offer functionality with the payment service. FIG. 30 shows an example order approval display 3000 that may be shown on the consumer device (e.g., at 1326 of method 1300). Much of the discussion above regarding order approval display 1700, as shown in FIG. 17, may be applicable to order approval display 3000, and are not repeated to avoid unnecessarily overcomplicating the disclosure. Order approval display 3000 further includes deal voucher discount display 3002, shown as a $10 deduction to the total cost. Accordingly, total cost 3004 has been updated to account for the applied deal voucher.

In some embodiments, the deal voucher discount and updated total cost may also be shown on receipts (e.g., the receipt sent to the consumer device at 1334 of method 1300 or 1430 of method 1400). As such, the consumer may be able to view receipts including redeemed promotional offers in addition to payment amounts.

If no deal voucher is determined to be applicable at 2908, the total cost may be sent to the consumer device at 2914 without any promotional offer-related deductions. Method 2900 may end at 2916.

FIG. 31 shows a flow chart of an example of a method 3100 for applying a reward in connection with a payment, performed in accordance with some embodiments. In some embodiments, one or more applicable rewards may be applied automatically when the consumer device is used to make a payment (e.g., as discussed with respect to methods 1300 and 1400). Similar to method 2900 discussed above, a central system (e.g., payment server 3304, promotional server 3320, and/or promotional/payment server 3402) may be configured to perform method 3100 in various embodiments. Alternatively and/or additionally, a merchant device (e.g., merchant device 3310) may be configured to perform method 3100. As will be discussed in greater detail below, method 3100 may be performed in connection with methods 1300, 1400 and/or 2900.

Method 3100 may begin at 3102 and proceed to 3104, where the central system may be configured to access one or more rewards and/or reward tracking data associated with, or otherwise available to, the payment account. For example, if a reward requires a consumer to make five purchases at the merchant, the reward tracking data may include a reward counter value that indicate how many of the five purchases the consumer has already accumulated. At 3106, the product identifying data for one or more items may be received. The discussion above regarding method 2900 at 2904 and 2906 may be applicable at 3104-3106.

At 3108, the central system may be configured to determine any of the one or more rewards associated with, or otherwise available to, the payment account may be redeemed. For example, if a reward specifies that the consumer is eligible to receive a free pair of socks after making five purchases of $100 or more at the merchant, reward eligibility may be determined at 3108 based on the product identifying data (e.g., indicating that the total cost is over $100) and the reward tracking data (e.g., the consumer has already made four out of the five required purchases). Rewards may be based on any criteria and as such, the determination at 3108 may be used to determine eligibility based on the criteria.

If it is determined that a reward may be redeemed, method 3100 may proceed to 3110, where a reward amount may be deducted from the total cost to generate an updated total cost. For example, the one or more items may include the pair of reward socks. As such, the value of the socks may be deducted from the total cost. In that sense, the product identifying data received at 3106 may include (either implicitly via the inclusion of a reward-related item or explicitly with additional data) an indication that the consumer is interested in redeeming the reward. The reward amount may be deducted prior to the determination 3108 so that the cost of the socks is not included for meeting the $100 purchase requirement of the reward.

At 3112, the updated total cost may be sent to the consumer device. If it is determined that no reward is redeemable at 3108, the total cost may be sent to the consumer device without any reward-related deductions at 3112. The discussion above at 2914 of method 2900 may be applicable to 3112.

At 3114, a determination may be made as to whether to update the reward tracking data. In some embodiments, the determination may be made after a payment has been validated and processed (e.g., at 1332 of method 1300).

If a reward was redeemed, the reward tracking data may be updated based on the redeemed reward. As discussed above, the reward tracking data may include a reward counter associated with the redeemed reward. After redemption, the reward counter may be set to 0 or some other starting value. Returning to the example regarding the pair of socks, if the reward is redeemed after the fifth purchase, the reward counter may be set so that the consumer may be eligible for the reward again after the next five purchases. In some embodiments, the reward tracking data may be updated such that the consumer is no longer eligible for the same reward and/or an additional counter may be used such that the reward may only be redeemed a certain number of times.

Additionally and/or alternatively, a determination may also be made as to whether a reward counter should be incremented based on the payment. For example, if a reward requires the consumer to spend over $100 five times and the consumer has spent $100 only three times, the reward counter may be incremented to indicate that the consumer has spent over $100 four times if the payment is over $100. In some embodiments, a merchant may offer a plurality of available rewards (e.g., as shown at promotional offers 2702 of merchant promotional offering display 2700 in FIG. 27).

As such, the determination may be made as to whether a reward counter should be incremented for some or all of the available rewards.

If incrementing a reward counter causes results in a reward being redeemable, a notification may be sent to the consumer device. FIG. 31 shows an example of a redeemable reward display 3100, in accordance with some embodiments. Reward display 3100 may include reward offer selection 3202 that may include reward value indicator 3204 and merchant indicator 3206. In some embodiments, the central system may be configured to send a redeemable reward message to the consumer device. Additionally and/or alternatively, the merchant device may be configured to push a redeemable reward message to the consumer device via the PAN connection.

Returning to 3114, if it is determined that the reward tracking data does not to be updated (e.g., the payment did not meet the requirements for any reward), method 3100 may proceed to 3118. Method 3100 may end at 3118.

Geofencing for Promotional Offers

In some embodiments, the central system may be configured to provide promotional offers to the consumer device based on the consumer device's location. As discussed above, the central system may receive the location of the consumer device via global positioning systems (GPS), cell tower triangulation, WiFi hotspots, or the like whenever the consumer device has an active connection to the Internet (e.g., via mobile broadband).

In some embodiments, the central system may be configured to provide promotional offers to the consumer device based on the location of the consumer device to various merchants. For example, when the consumer device is running an application (e.g., in the background or foreground), the central system may be configured to push a notification that indicates one or more available promotional offers are available (e.g., for purchase and/or redemption) at a nearby merchant. Additionally and/or alternatively, the central system may be configured to send the notification to the consumer device via SMS text, email, or any other techniques.

In some embodiments, the central system and/or consumer device may be configured to determine and/or set a geofencing distance for the promotional offer notifications such that only promotional offers within a certain distance from the consumer device's location may be sent. Furthermore, any of the techniques described herein for determining a promotional offer may be used in connection with the geofencing distance. For example, the consumer's purchase history could be used so that only promotional offers within the geofencing distance that are likely to be of interest to the consumer are sent.

In some embodiments, the central system may be configured to send one or more promotional offers to the consumer device at schedule times. For example, the central system may ping the consumer device for its location at certain times (e.g., restaurant offers around lunch time), at schedule intervals (e.g., every three hours), based on events (e.g., sports games, concerts, etc.), or virtually any other condition. In response, the consumer device may be configured to send its location to the central system, which may then be used to generate the promotional offer.

Exemplary System Architecture

FIG. 33 shows system 3300 including an example network architecture, which may include one or more devices and sub-systems that are configured to implement some embodiments discussed herein. For example, system 3300 may include payment system 3302, which can include, for example, payment server 3304 and payment database 3306, among other things (not shown). Payment server 3304 may be any suitable network server and/or other type of processing device. Payment database 3306 may be any suitable network database configured to store information such as merchant and consumer information, login data, payment account data, payment source data, transaction data, and/or wallet identifying data, such as may be used to facilitate payment as discussed herein. In this regard, system 3302 may include, for example, at least one backend data server, network database, cloud computing device, among other things.

In some embodiments, system 3300 may further include promotional system 3316. Promotional system 3316 may include promotional server 3320 and promotional database 3318, among other things. Promotional server 3320 may be any suitable network server and/or other type of processing device. Promotional database 3318 may be any suitable network database configured to store information such as promotional account data, deal voucher data, available deal voucher data, unused deal voucher data, reward data, reward tracking data, or any other data that may be used to facilitate promotional offers as discussed herein. In this regard, system 3316 may include, for example, at least one backend data server, network database, cloud computing device, among other things. In some embodiments, the promotional server 3320 may be configured to facilitate promotional offer functionality (e.g., sending deal data to merchant device 3310, consumer device 3312, and/or payment system 3306) but is otherwise uninvolved in the payment processing functionality.

Payment system 3202 and/or promotional system 3316 may be coupled to one or more merchant devices (e.g., merchant device 3310) via network 3308. In this regard, network 3308 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 3308 may include a cellular telephone, an 802.11, 802.16, 802.20, and/or WiMax network. Further, the network 3308 may include a public network, such as the Internet, a private network, such as an intranet, or combinations thereof, and may utilize a variety of networking protocols now available or later developed including, but not limited to TCP/IP based networking protocols.

As discussed above, merchant device 3310 may be associated with a merchant, such as a retail store, restaurant, etc. In some embodiments, merchant device 3310 may be a POS device that is configured to receive payments at the merchant's shop. As such, merchant device 3310 may include a personal computer and/or other networked device, such as a cellular phone, tablet computer, mobile device, etc., that may be used for any suitable purpose in addition to providing point-of-sale functionality at the restaurant. Accordingly, display 2300 may be provided to a merchant by a POS device.

System 3300 may further include one or more consumer devices (e.g., consumer device 3312). As shown in FIG. 33, consumer device 3312 may connect with merchant device 3310 via network 3308 and/or PAN network 3322. As such, consumer device 3312 may be configured to make payments with merchant device 3310 via PAN network 3322 even if consumer device 3312 and/or merchant device 3310 do not have active connections with network 3308.

In some embodiments, system 3300 may further include one or more third party systems (e.g., third party system 3314), among other things. For example, different third party systems may be associated with different types of payment sources. Thus for each payment source, data may be sent to an appropriate third party system (e.g., a credit card transaction server, etc.) to validate and/or process payments.

FIG. 34 shows an example promotional/payment system 3400, configured in accordance with some embodiments. Promotional/payment system 3400 may include promotional/payment server 3402, which may be configured to perform the payment and promotional offer capabilities discussed herein. Promotional/payment system 3400 may further include payment database 3404 and promotional database 3406 that may be accessed, updated or otherwise managed by promotional/payment server 3402. In some embodiments, promotional/payment system 3400 may communicate with third party system 3314, consumer device 3312 and/or merchant device 3310 via network 3308.

In some embodiments, payment system 3302, promotional system 3316, and/or promotional/payment system 3400 may be a multi-tenant database system configured to provide services to a plurality of consumers and merchants. Additionally and/or alternatively, the systems may be configured to include, or work in connection with, one or more online ordering systems (e.g., shop online and pickup), merchant systems (e.g., kitchen systems for restaurants), and/or appointment systems (e.g., scheduling a reservation at a restaurant). It is appreciated that the payment techniques disclosed herein may be applicable to any environment that involves financial transactions.

FIG. 35 shows a schematic block diagram of circuitry 3500, some or all of which may be included in, for example, payment system 3302, promotional system 3316, promotional/payment system 3400, consumer device 3312, and/or merchant device 3310. As illustrated in FIG. 35, in accordance with some example embodiments, circuitry 3500 may include various means, such as one or more processors 3502, memories 3504, communications modules 3506, and/or input/output modules 3508.

In some embodiments, such as when circuitry 3500 is included in merchant device 3310, payment system 3302, promotional system 3316, and/or promotional/payment system 3400, payment/redemption module 3510 may also or instead be included. As referred to herein, "module" includes hardware, software and/or firmware configured to perform one or more particular functions. In this regard, the means of circuitry 3500 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 3504) that is executable by a suitably configured processing device (e.g., processor 3502), or some combination thereof.

Processor 3502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 35 as a single processor, in some embodiments, processor 3502 comprises a plurality of processors. The plurality of processors may be embodied on a single computing device or may be distributed across a plurality of computing devices collectively configured to function as circuitry 3500. The plurality of processors may be in operative communication with each other and may be collectively configured to perform one or more functionalities of circuitry 3500 as described herein. In an example embodiment, processor 3502 is configured to execute instructions stored in memory 3504 or otherwise accessible to processor 3502. These instructions, when executed by processor 3502, may cause circuitry 3500 to perform one or more of the functionalities of circuitry 3500 as described herein.

Whether configured by hardware, firmware/software methods, or by a combination thereof, processor 3502 may comprise an entity capable of performing operations according to embodiments of the present invention while configured accordingly. Thus, for example, when processor 3502 is embodied as an ASIC, FPGA or the like, processor 3502 may comprise specifically configured hardware for conducting one or more operations described herein. As another example, when processor 3502 is embodied as an executor of instructions, such as may be stored in memory 3504, the instructions may specifically configure processor 3502 to perform one or more algorithms and operations described herein, such as those discussed in connection with FIGS. 1, 2, 13, 14, 24, 29 and 31.

Memory 3504 may comprise, for example, volatile memory, non-volatile memory, or some combination thereof. Although illustrated in FIG. 35 as a single memory, memory 3504 may comprise a plurality of memory components. The plurality of memory components may be embodied on a single computing device or distributed across a plurality of computing devices. In various embodiments, memory 3504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 3504 may be configured to store information, data (including deal parameter data and/or analytics data), applications, instructions, or the like for enabling circuitry 3500 to carry out various functions in accordance with example embodiments of the present invention. For example, in at least some embodiments, memory 3504 is configured to buffer input data for processing by processor 3502. Additionally or alternatively, in at least some embodiments, memory 3504 is configured to store program instructions for execution by processor 3502. Memory 3504 may store information in the form of static and/or dynamic information. This stored information may be stored and/or used by circuitry 3500 during the course of performing its functionalities.

Communications module 3506 may be embodied as any device or means embodied in circuitry, hardware, a computer program product comprising computer readable program instructions stored on a computer readable medium (e.g., memory 3504) and executed by a processing device (e.g., processor 3502), or a combination thereof that is configured to receive and/or transmit data from/to another device, such as, for example, a second circuitry 3500 and/or the like. In some embodiments, communications module 3506 (like other components discussed herein) can be at least partially embodied as or otherwise controlled by processor 3502. In this regard, communications module 3506 may be in communication with processor 3502, such as via a bus. Communications module 3506 may include, for example, an antenna, a transmitter, a receiver, a transceiver, network interface card and/or supporting hardware and/or firmware/software for enabling communications with another computing device. Communications module 3506 may be configured to receive and/or transmit any data that may be stored by memory 3504 using any protocol that may be used for communications between computing devices. Communications module 3506 may additionally or alternatively be in communication with the memory 3504, input/output module 3508 and/or any other component of circuitry 3500, such as via a bus.

Input/output module 3508 may be in communication with processor 3502 to receive an indication of a user input and/or to provide an audible, visual, mechanical, or other output to a user (e.g., merchant and/or consumer). Some example visual outputs that may be provided to a user by circuitry 3500 are discussed in connection with FIGS. 3-12, 15-23, 25-28, 30 and 32. As such, input/output module 3508 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 3500 is embodied as a server or database, aspects of input/output module 3508 may be reduced as compared to embodiments where circuitry 3500 is implemented as an end-user machine (e.g., consumer device 3312 and/or merchant device 3310) or other type of device designed for complex user interactions. In some embodiments (like other components discussed herein), input/output module 3508 may even be eliminated from circuitry 3500. Alternatively, such as in embodiments wherein circuitry 3500 is embodied as a server or database, at least some aspects of input/output module 3508 may be embodied on an apparatus used by a user that is in communication with circuitry 3500, such as for example, merchant device 3310 and/or consumer device 3312. Input/output module 3508 may be in communication with memory 3504, communications module 3506, and/or any other component (s), such as via a bus. Although more than one input/output module and/or other component can be included in circuitry 3500, only one is shown in FIG. 35 to avoid overcomplicating the drawing (like the other components discussed herein).

Payment/redemption module 3510 may also or instead be included and configured to perform the functionality discussed herein related to facilitating payment transactions and/or promotional offers discussed above. In some embodiments, some or all of the functionality facilitating payment transactions and/or promotional offers may be performed by processor 3502. In this regard, the example processes and algorithms discussed herein can be performed by at least one processor 3502 and/or payment/redemption module 3510. For example, non-transitory computer readable storage media can be configured to store firmware, one or more application programs, and/or other software, which include instructions and other computer-readable program code portions that can be executed to control each processor (e.g., processor 3502 and/or payment/redemption module 3510) of the components of system 3500 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 3500. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 3502 and/or deal payment/redemption module 3510 discussed above with reference to FIG. 35, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2304) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the payment server. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A networked device comprising processing circuitry configured to:
   receive consumer identifying data from a consumer device;
   generate anonymous identifying data associated with the consumer identifying data and a private key, wherein the anonymous identifying data and the private key have a mathematical relationship;
   associate promotional data with the consumer identifying data, wherein the promotional data is also associated with a merchant;
   send the anonymous identifying data to the consumer device, wherein:
      the anonymous identifying data is sent to a merchant device by the consumer device without action of the networked device, and
      the merchant device is associated with the merchant;
   receive the anonymous identifying data from the merchant device;
   validate the anonymous identifying data received from the merchant device with the mathematical relationship and the private key;
   send the consumer identifying data to the merchant device after validating the anonymous identifying data; and
   send the promotional data.

2. The networked device of claim 1, wherein the processing circuitry is further configured to:
   receive a request to authorize a payment of a total amount, the total amount to be paid to the merchant by the networked device from a payment account associated with the consumer device;
   determine the promotional data is associated with a discount;
   process the request by applying the discount to the total amount and pay a remaining amount to the merchant from the payment account; and
   send a payment confirmation indicating payment of a total cost less the discount to the merchant device after processing the request.

3. The networked device of claim 2, wherein the processing circuitry is further configured to:
   retain a portion of the remaining amount as a fee for services provided to the merchant device.

4. The networked device of claim 2, wherein the processing circuitry is further configured to:
   facilitate payment to a merchant account associated with the merchant device.

5. The networked device of claim 1, wherein the processing circuitry is further configured to:
   determine when the consumer device is in proximity to the merchant device; and
   in response to determining when the consumer device is in proximity to the merchant device, send the promotional data to the consumer device.

6. The networked device of claim 5, wherein the processing circuitry is configured to:
   determine that the consumer device is in proximity to the merchant device based at least in part on a received signal strength indication or travel-time locating technique.

7. The networked device of claim 1, wherein the anonymous identifying data comprises one or more of keys, random numbers, codes or tokens.

8. A computer-implemented method of facilitating a payment by a networked device, comprising:
   receiving consumer identifying data from a consumer device;
   generating anonymous identifying data associated with the consumer identifying data and a private key, wherein the anonymous identifying data and the private key have a mathematical relationship;
   associating promotional data with the consumer identifying data, wherein the promotional data is also associated with a merchant;
   sending the anonymous identifying data to the consumer device, wherein:
      the anonymous identifying data is sent to a merchant device by the consumer device without action of the networked device, and
      the merchant device is associated with the merchant;
   receiving the anonymous identifying data from a merchant device, wherein the merchant device is associated with the merchant;
   validating the anonymous identifying data received from the merchant device with the mathematical relationship and the private key;
   sending the consumer identifying data to the merchant device after validating the anonymous identifying data; and
   sending the promotional data.

9. The computer-implemented method of claim 8, further comprising:
   receiving a request to authorize a payment of a total amount, the total amount to be paid to the merchant by the networked device from a payment account associated with the consumer device;
   determining the promotional data is associated with a discount;
   processing the request by applying the discount to the total amount and pay a remaining amount to the merchant from the payment account; and sending a payment confirmation indicating payment of a total cost less the discount to the merchant device after processing the request.

10. The computer-implemented method of claim 9, further comprising:
retaining a portion of the remaining amount as a fee for services provided to the merchant device.

11. The computer-implemented method of claim 9, further comprising:
facilitating payment to a merchant account associated with the merchant device.

12. The computer-implemented method of claim 8, further comprising:
determining when the consumer device is in proximity to the merchant device; and
in response to determining when the consumer device is in proximity to the merchant device, sending the promotional data to the consumer device.

13. The computer-implemented method of claim 12, wherein the determining that the consumer device is in proximity to the merchant device based at least in part on a received signal strength indication or travel-time locating technique.

14. The computer-implemented method of claim 8, wherein the anonymous identifying data comprises one or more of keys, random numbers, codes or tokens.

15. A computer program product comprising at least one computer readable non-transitory memory having program code instructions stored thereon, the program code instructions which when executed by an apparatus cause the apparatus to at least:
receive consumer identifying data from a consumer device;
generate anonymous identifying data associated with the consumer identifying data and a private key, wherein the anonymous identifying data and the private key have a mathematical relationship;
associate promotional data with the consumer identifying data, wherein the promotional data is also associated with a merchant;
send the anonymous identifying data to the consumer device, wherein:
the anonymous identifying data is sent to a merchant device by the consumer device without action of the apparatus, and
the merchant device is associated with the merchant;
receive the anonymous identifying data from the merchant device;
validate the anonymous identifying data received from the merchant device with the mathematical relationship and the private key;
send the consumer identifying data to the merchant device after validating the anonymous identifying data; and
send the promotional data.

16. The computer program product of claim 15, further comprising program code instructions, which when executed by the apparatus further cause the apparatus at least to:
receive a request to authorize a payment of a total amount, the total amount to be paid to the merchant by the apparatus from a payment account associated with the consumer device;
determine the promotional data is associated with a discount;
process the request by applying the discount to the total amount and pay a remaining amount to the merchant from the payment account; and
send a payment confirmation indicating payment of a total cost less the discount to the merchant device after processing the request.

17. The computer program product of claim 16, further comprising program code instructions, which when executed by the apparatus further cause the apparatus at least to:
retain a portion of the remaining amount as a fee for services provided to the merchant device.

18. The computer program product of claim 16, further comprising program code instructions, which when executed by the apparatus further cause the apparatus at least to:
facilitate payment to a merchant account associated with the merchant device.

19. The computer program product of claim 15, further comprising program code instructions, which when executed by the apparatus further cause the apparatus at least to:
determine when the consumer device is in proximity to the merchant device; and
in response to determining when the consumer device is in proximity to the merchant device, send the promotional data to the consumer device.

20. The computer program product of claim 19, further comprising program code instructions, which when executed by the apparatus further cause the apparatus at least to:
determine that the consumer device is in proximity to the merchant device based at least in part on a received signal strength indication or travel-time locating technique.

* * * * *